(12) United States Patent
Klein et al.

(10) Patent No.: US 11,099,863 B2
(45) Date of Patent: Aug. 24, 2021

(54) POSITIONING USER INTERFACE COMPONENTS BASED ON APPLICATION LAYOUT AND USER WORKFLOWS

(71) Applicant: MICROSOFT TECHNOLOGY LICENSING, LLC, Redmond, WA (US)

(72) Inventors: Christian Klein, Duvall, WA (US); Lauren Edelmeier, Seattle, WA (US); Ryan Pendlay, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/813,689

(22) Filed: Mar. 9, 2020

(65) Prior Publication Data

US 2021/0096887 A1 Apr. 1, 2021

Related U.S. Application Data

(60) Provisional application No. 62/909,224, filed on Oct. 1, 2019.

(51) Int. Cl.
*G06F 3/048* (2013.01)
*G06F 9/451* (2018.01)
(Continued)

(52) U.S. Cl.
CPC ............ *G06F 9/451* (2018.02); *G06F 1/1616* (2013.01); *G06F 11/3476* (2013.01); *G09G 5/14* (2013.01)

(58) Field of Classification Search
CPC .... G06F 9/451; G06F 1/1616; G06F 11/3476; G06F 3/048
See application file for complete search history.

(56) References Cited

U.S. PATENT DOCUMENTS

2004/0056900 A1 3/2004 Blume et al.
2004/0095401 A1* 5/2004 Tomimori ............... G06F 9/451
715/864
(Continued)

OTHER PUBLICATIONS

"Non Final Office Action Issued in U.S. Appl. No. 16/777,854", dated Jan. 22, 2021, 9 Pages.
(Continued)

*Primary Examiner* — Rashawn N Tillery
(74) *Attorney, Agent, or Firm* — Newport IP, LLC; Jacob P. Rohwer

(57) ABSTRACT

Technologies are disclosed herein for positioning application windows based on existing application layout and anticipated user workflows. When an existing application window and a recently launched application window are determined to be related to a workflow, and the default position of the recently launched application window is determined to overlap with the existing application window, the recently launched application window may be displayed in a non-default display region to avoid occlusion. By avoiding occlusion, the foldable device may provide a user-friendly application layout, reducing the number of times a user will move, resize, or switch between application windows in the workflow. This in turn may improve device performance and efficiency while reducing errors attributable to user input. The user-friendly layout may also enable a user to view more content at the same time, increasing productivity, reducing eye strain, facilitating operations such as cut and paste, etc.

20 Claims, 24 Drawing Sheets

(51) Int. Cl.
  *G09G 5/14* (2006.01)
  *G06F 1/16* (2006.01)
  *G06F 11/34* (2006.01)

(56) References Cited

U.S. PATENT DOCUMENTS

| | | | |
|---|---|---|---|
| 2006/0097955 A1* | 5/2006 | Kato | H04N 21/41407 345/1.1 |
| 2009/0276729 A1 | 11/2009 | Cantu-paz | |
| 2010/0056224 A1* | 3/2010 | Kim | H04M 1/72469 455/566 |
| 2010/0182265 A1* | 7/2010 | Kim | G06F 1/1641 345/173 |
| 2011/0138314 A1* | 6/2011 | Mir | G06F 9/452 715/779 |
| 2011/0199361 A1* | 8/2011 | Shin | G06F 1/1616 345/211 |
| 2013/0227596 A1 | 8/2013 | Pettis et al. | |
| 2014/0303839 A1 | 10/2014 | Filev et al. | |
| 2014/0351748 A1* | 11/2014 | Xia | G06F 3/0481 715/798 |
| 2016/0048363 A1* | 2/2016 | North | G06F 1/1647 345/1.1 |
| 2017/0357292 A1* | 12/2017 | Cho | G06F 3/03545 |
| 2018/0239770 A1 | 8/2018 | Ghotbi et al. | |
| 2018/0285047 A1* | 10/2018 | Jeune | G06F 3/0445 |
| 2018/0295146 A1 | 10/2018 | Kovega et al. | |
| 2018/0308452 A1 | 10/2018 | Zhang | |
| 2018/0329508 A1 | 11/2018 | Klein et al. | |
| 2019/0279407 A1 | 9/2019 | Mchugh et al. | |
| 2019/0388011 A1 | 12/2019 | Johnson et al. | |
| 2020/0104334 A1 | 4/2020 | Khanna et al. | |
| 2020/0249798 A1* | 8/2020 | Sirpal | G06F 1/1647 |
| 2020/0257334 A1* | 8/2020 | Han | G06F 1/1641 |
| 2020/0326900 A1* | 10/2020 | Kwon | G06F 3/1446 |
| 2021/0001227 A1 | 1/2021 | Farudi et al. | |

OTHER PUBLICATIONS

"International Search Report and Written Opinion Issued in PCT Application No. PCT/US20/040385", dated Oct. 20, 2020, 18 Pages.

"International Search Report and Written Opinion Issued in PCT Application No. PCT/US2020/051375", dated Mar. 5, 2021, 21 Pages.

* cited by examiner

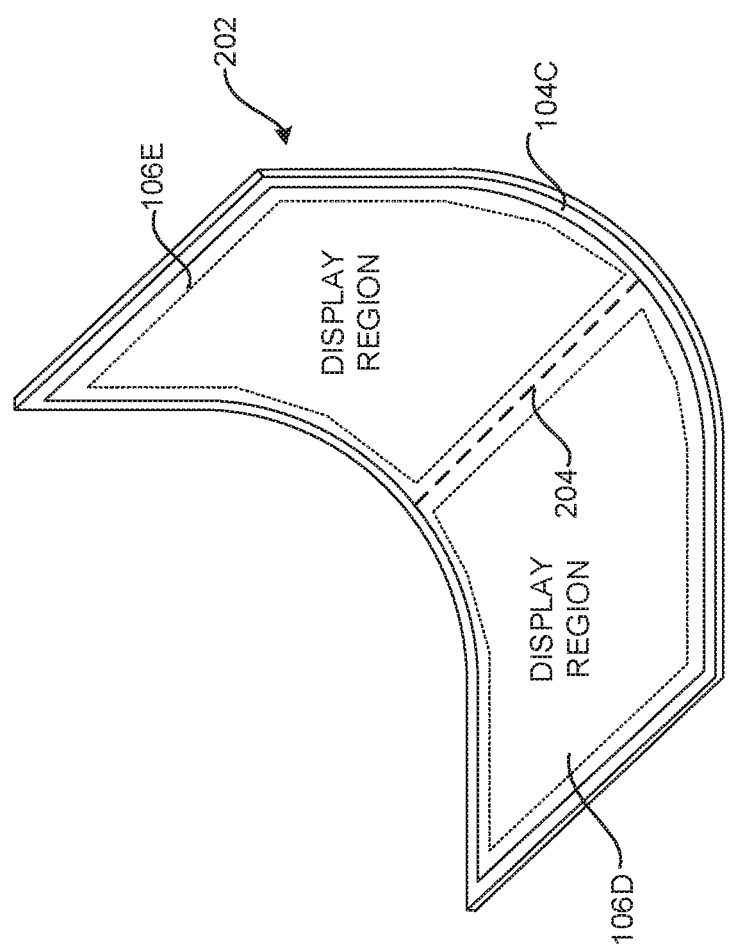

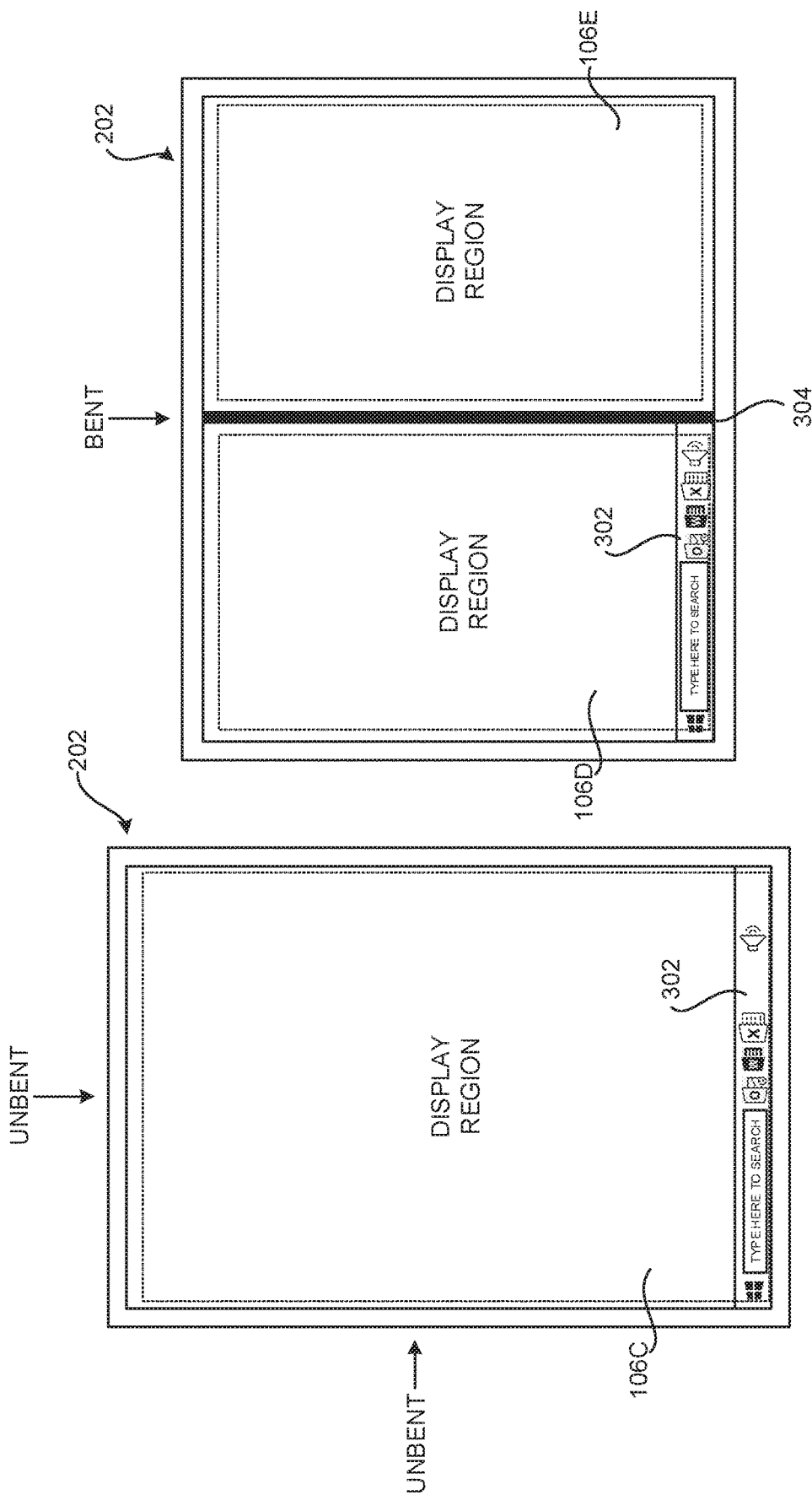

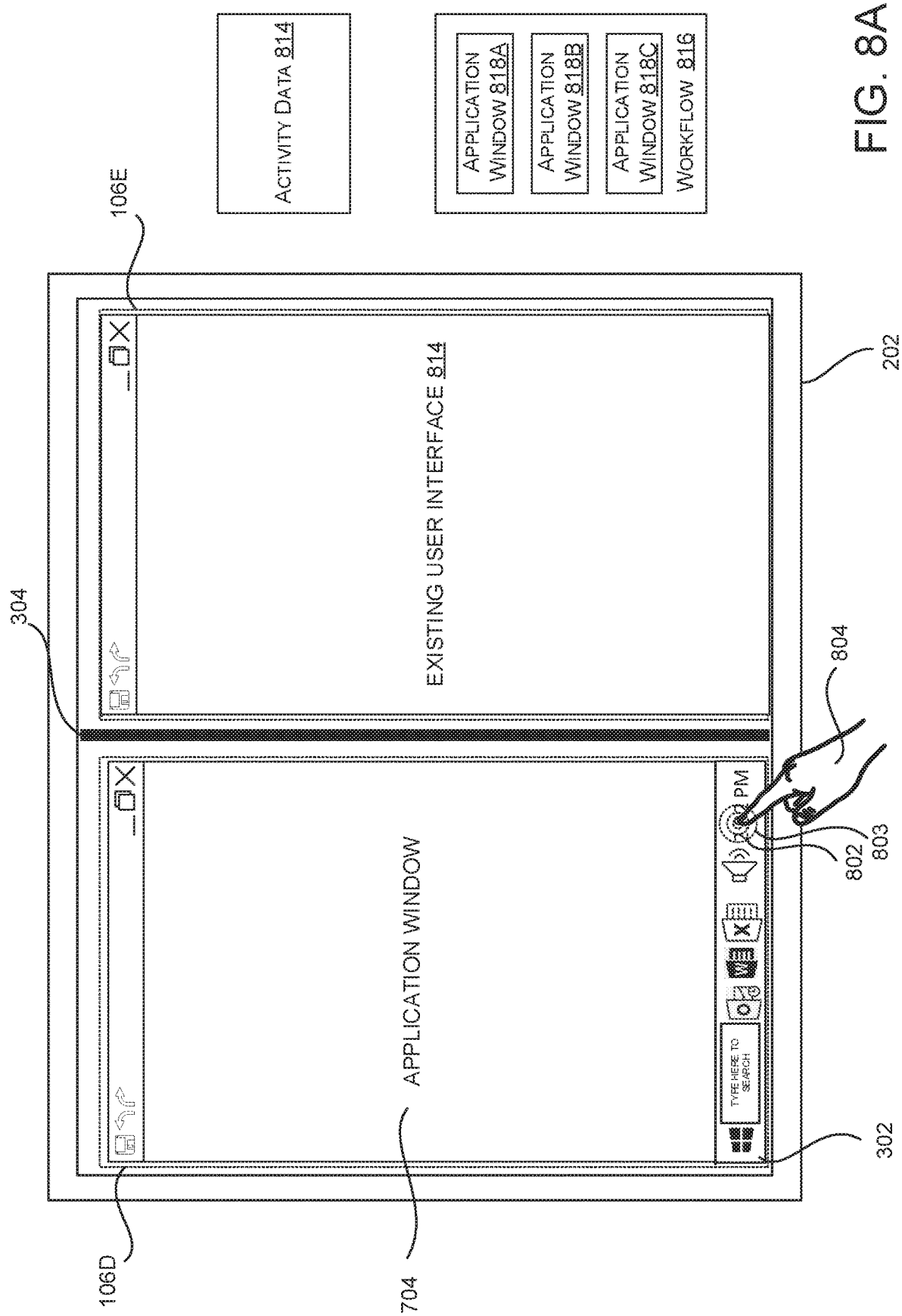

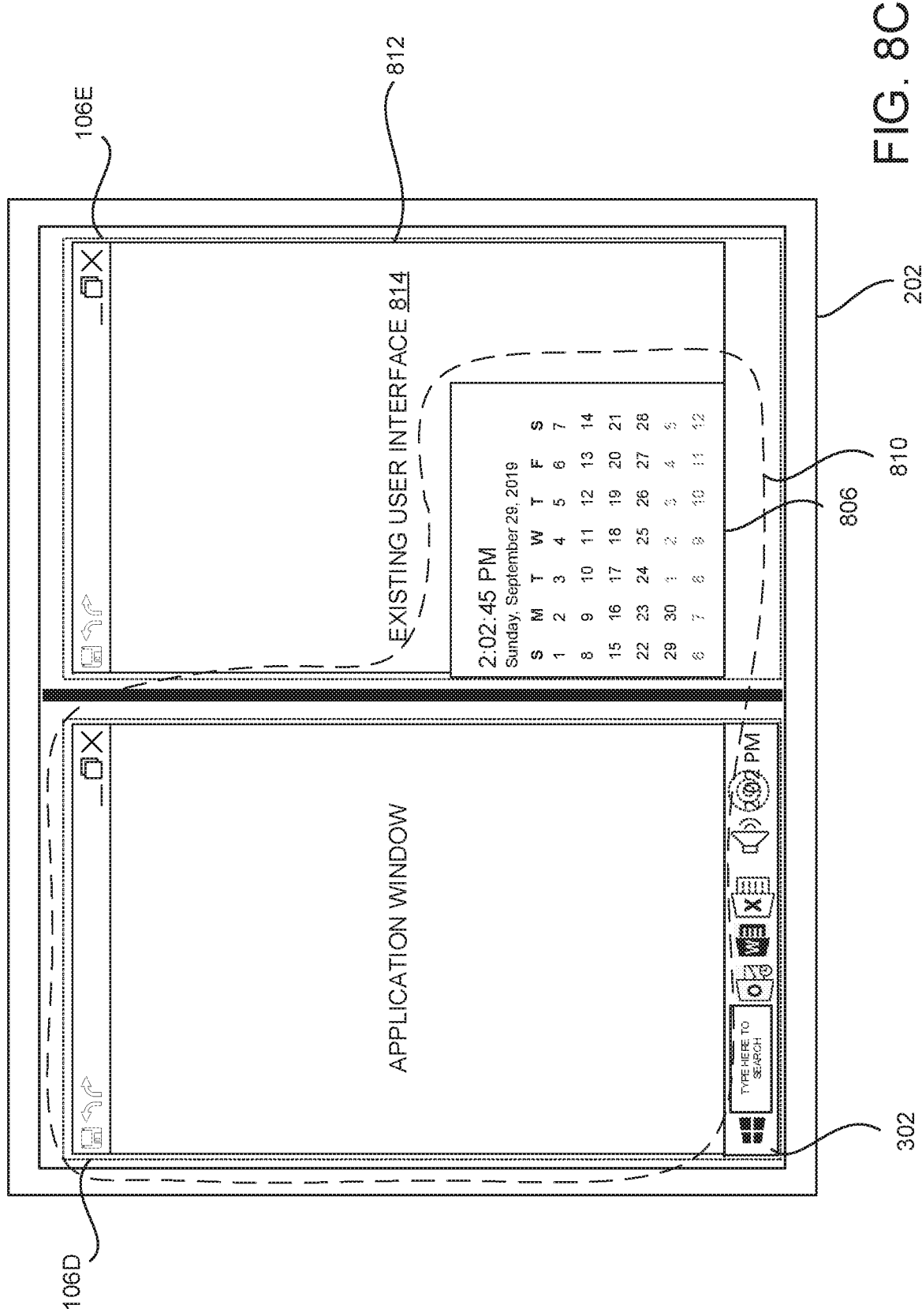

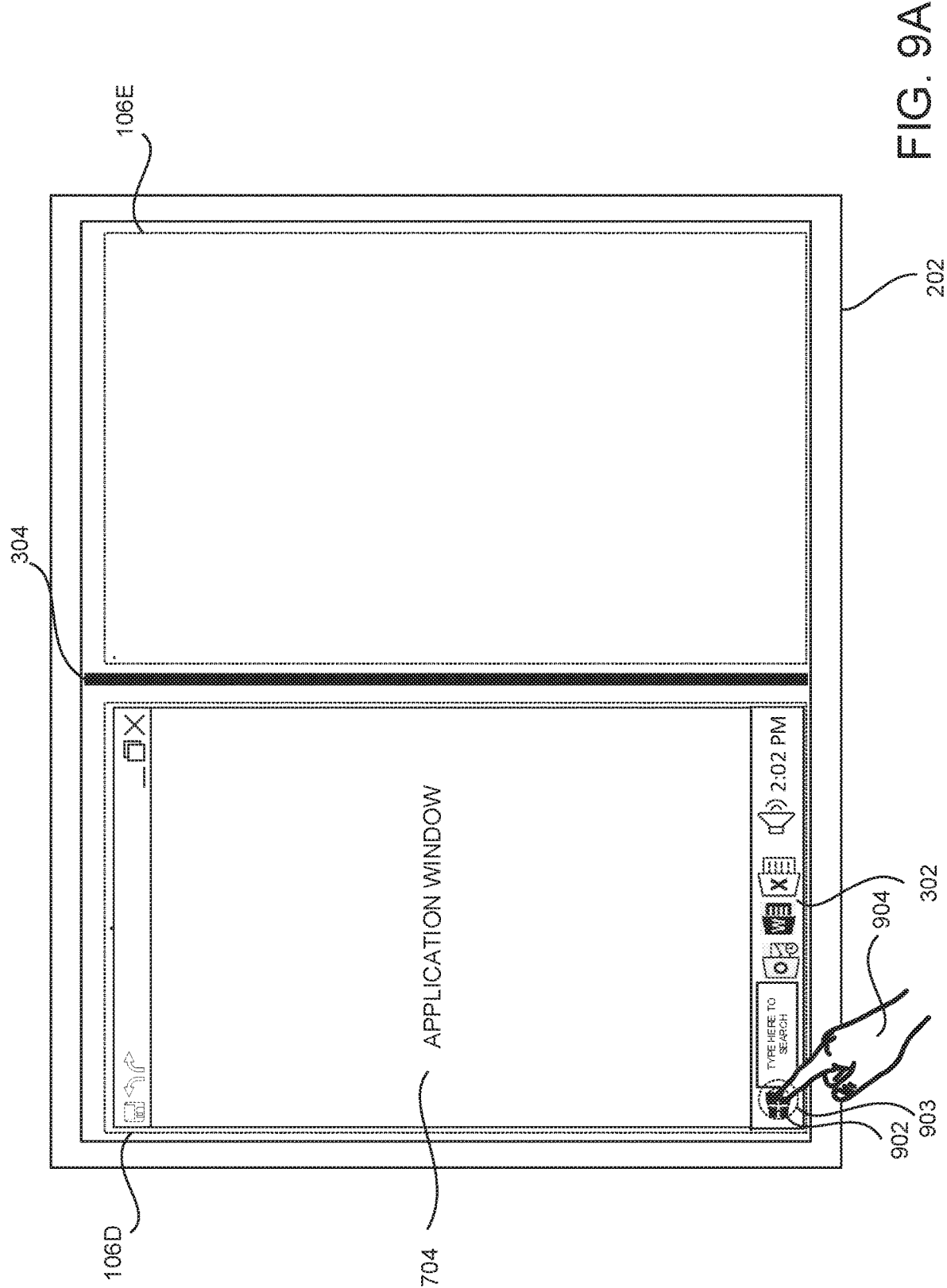

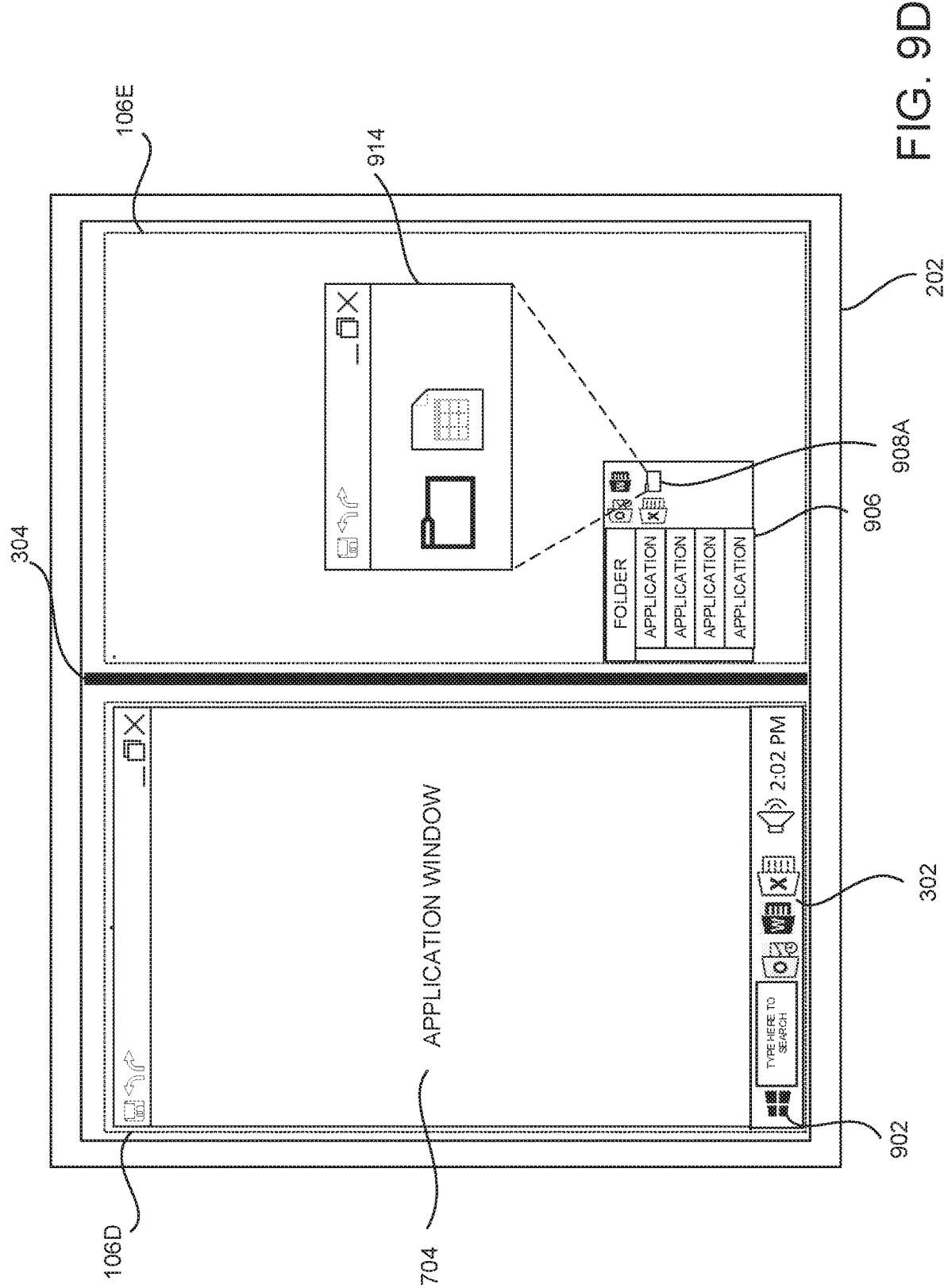

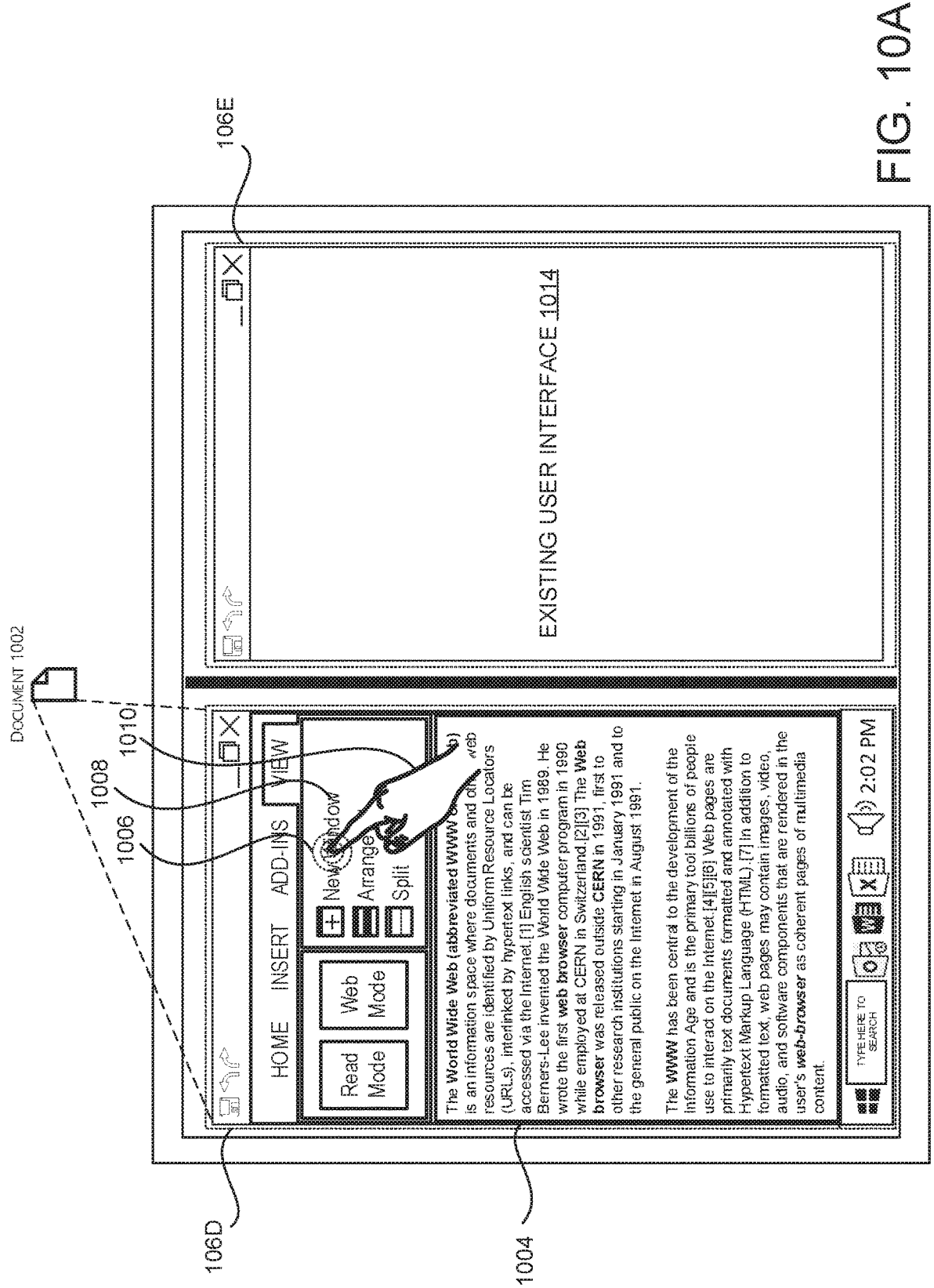

POSITIONING USER INTERFACE COMPONENTS BASED ON APPLICATION LAYOUT AND USER WORKFLOWS

CROSS-REFERENCE TO RELATED APPLICATION

This application claims priority to U.S. Provisional Application No. 62/909,224, entitled "UI ADAPTATIONS BASED ON INFERRED CONTENT OCCLUSION AND USER INTENT," which was filed on Oct. 1, 2019, and which is expressly incorporated herein by reference in its entirety.

BACKGROUND

Foldable computing devices include devices with two screens joined with a hinge or devices with bendable screens. These types of devices can provide benefits over traditional computing devices such as laptop computers. Commonly, however, these devices implement user interface ("UI") paradigms originally designed for computing devices with traditional form factors, e.g., a foldable device having a screen and keyboard on opposite sides of a hinge. As a result, UIs provided by traditional foldable computing devices can be cumbersome and error-prone, which can lead to incorrect, inefficient, or inadvertent user input and unnecessary consumption of computing resources.

It is with respect to these and other technical challenges that the disclosure made herein is presented.

SUMMARY

Technologies are disclosed herein for positioning application windows based on a layout of existing application windows and an anticipated user workflow. In some configurations, a system analyzes activity data to identify application windows that are associated with a workflow. When an existing application window and a recently launched application window are determined to be related to a workflow, and the default position of the recently launched application window is determined to overlap with the existing application window, the recently launched application window may be displayed in a non-default display region to mitigate content occlusion. In other configurations, the recently launched application window may be displayed in a non-default display region in response to detecting the association with the workflow whether or not there would be any overlap between the existing application window and the recently launched application window.

By mitigating the occlusion of content displayed on user interfaces that are associated with the same workflow, and by proactively displaying application windows associated with a workflow in different display regions, a multi-screen device, such as a foldable device, may provide a user-friendly application layout, reducing the number of times a user will move, resize, or switch between application windows associated with the workflow. This in turn may improve device performance and efficiency while reducing errors attributable to user input. The user-friendly layout may also enable a user to view more content at the same time, increasing productivity, reducing eye strain, facilitating operations such as "drag and drop" and "cut and paste", etc. Improvement of such user interactions can also lead to improved efficiencies with respect to a number of computer resources, such as processing cycles, network bandwidth, and memory usage.

In some configurations, a user workflow refers to a series of steps performed by two or more application windows to perform a task. It is often beneficial for the application windows associated with a workflow to be displayed side-by-side, e.g. on different display regions. For example, the content of one application window may give context to a task performed by another application window, such that it is beneficial to view both application windows simultaneously.

However, by default, an application window is displayed in the display region that it was launched from. In some instances, the default display region will already contain an existing application window that is associated with the same workflow. As such, displaying the application window in the default display region could occlude at least part of the existing application window. It may also hamper effective use of the foldable device to display the application window and the existing application window in the same display region, even if they would not overlap. For example, displaying each application window in a different display region allows more of each application to be viewed simultaneously. To avoid occluding the existing application window, and to improve user interaction with the foldable device, the foldable device may display the application window in a nondefault display region. The size and position of the application window may also be modified to improve the application layout.

For example, an email application may display, in a first display region, an email that has an attached photo. By default, a photo viewing application launched from the email application will be located in the same display region as the email application. In many cases, the photo viewing application will occlude at least part of the email application, reducing usability and increasing the likelihood that a user will move, resize, and/or switch between the application windows. Even if the photo viewing application were not to overlap the email application, squeezing both application windows into the same display region may provide a less effective user interface than displaying each application window on a different display region. To overcome these deficiencies, some configurations determine that the email application and the photo viewing application are associated with a user workflow because the photo viewing application was launched from a UI element within the email application. In response to determining that the email application and the photo viewing application are associated with the same workflow, the foldable device may move the photo viewing application to a non-default display region.

There are a number of ways in which two or more application windows may be determined to be associated with a workflow. Some techniques generate a list of application window names based on historical activity data. The foldable device may then monitor application window launches. When all of the named application windows are executing concurrently, the application windows are considered to be associated with the workflow.

A list of application window names may be identified in part based on usage patterns of previous instances of the application windows. For example, launching application windows sequentially, moving application windows so that they are located in different display regions, opening the same file in different application windows, having application windows exchange data, etc., are all usage patterns usable to identify a list of application window names.

A list of application window names may also be generated in part based on associations made by a user via an operating system. For example, if two application windows are associated with shortcuts located in the same folder, or if two application windows are launched by a single shortcut, the names of the application windows may be used to generate a list of application window names. In some configurations, a list of application window names may be determined in part based on having a shared a classification (e.g. "productivity software").

Another technique identifies application windows that are associated with a workflow based on real-time information contained in the application windows—i.e. the application state used to determine that application windows are associated with a workflow is found in same instances of the application windows that may be displayed in a non-default location. For example, application windows may be associated with a 'same data resource workflow' when they have opened the same file or other data resource as each other. Similarly, application windows that display the same or related content may be associated with a 'same content workflow.' The 'same data resource workflow' and the 'same content workflow', and other runtime-based determinations, are not based on a list of application window names that were generated based on usage patterns of previous instances of the application windows. Instead, any application windows that meet the criteria may be identified as being associated with a workflow.

Through implementations of the disclosed technologies, UIs can be provided by foldable devices that are easier to utilize and that result in fewer user input errors. Additionally, the utilization of computing resources by foldable computing devices can be reduced by avoiding the processing associated with inefficient navigation of a UI and inadvertent or incorrect user input. Other technical benefits not specifically mentioned herein can also be realized through implementations of the disclosed subject matter.

It should also be appreciated that the above-described subject matter can be implemented as a computer-controlled apparatus, a computer-implemented method, a computing device, or as an article of manufacture such as a computer readable medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 2A-2C are device posture diagrams illustrating aspects of the configuration and operation of a bendable computing device that implements the disclosed technologies in one particular configuration;

FIGS. 3A and 3B are device user interface diagrams illustrating various adaptations for multiple screen modes of bendable devices, according to one embodiment disclosed herein;

FIG. 8A is a device user interface diagram illustrating aspects of determining that a recently launched application window and an existing application window are associated with a user workflow, according to one embodiment;

FIG. 8C is a device user interface diagram illustrating a non-default location of a user interface that is associated with a workflow with an existing application window, according to one embodiment;

FIG. 9A is a device user interface diagram illustrating aspects of an OS shell launching surface that facilitates launching an application window in a non-default display region, according to one embodiment;

FIG. 9D is a device user interface diagram illustrating display of an application window in response to activation of a UI element on a launching surface, according to one embodiment;

FIG. 10A is a device user interface diagram illustrating aspects of identifying two or more application windows that are associated with a workflow by identifying two or more application windows that are using the same resource, according to one embodiment;

DETAILED DESCRIPTION

Figure 1B:
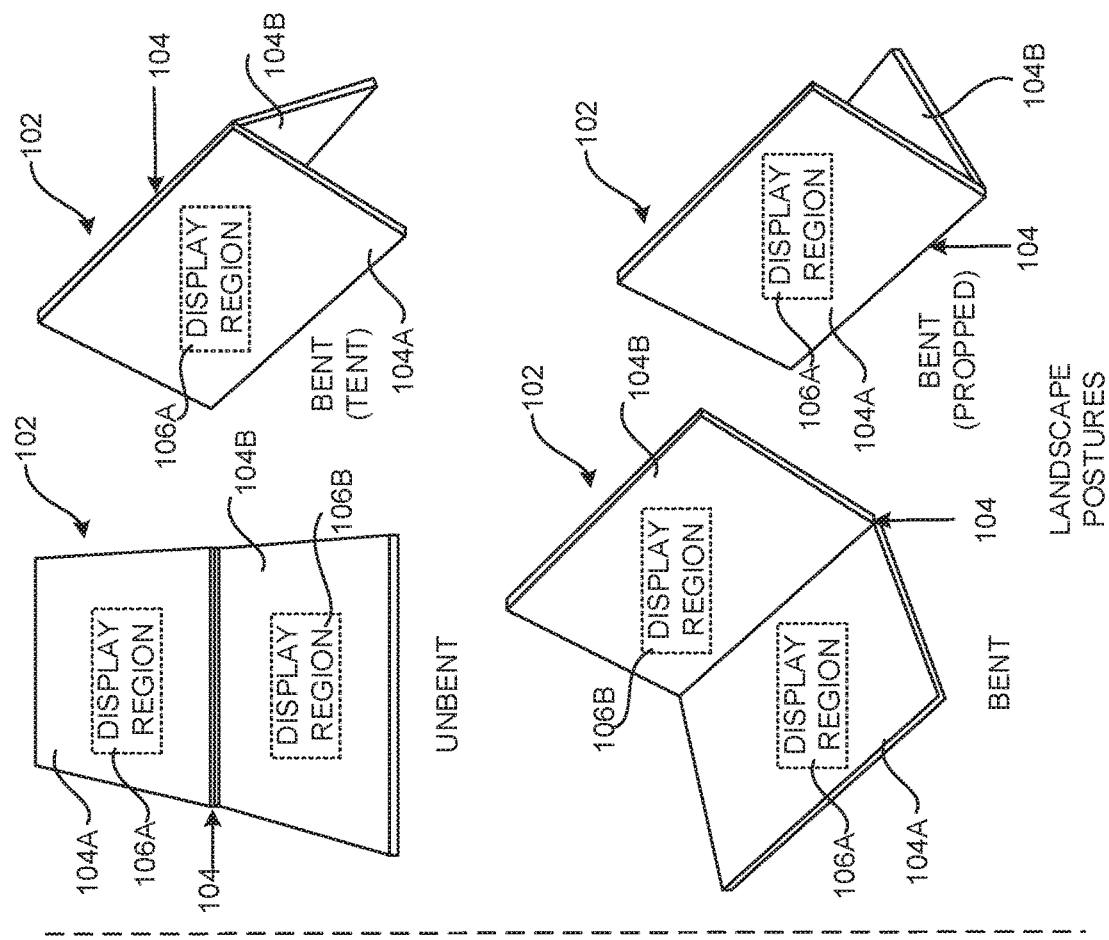
FIGS. 1A and 1B are device posture diagrams illustrating aspects of the configuration and operation of a hinged computing device that implements the disclosed technologies in one particular configuration.

The following detailed description is directed to technologies for opportunistically displaying application windows in non-default display regions to enhance a predicted user workflow. As discussed briefly above, implementations of the disclosed technologies can enable UIs to be provided that are easier to utilize and that result in fewer user input errors. Consequently, the utilization of computing resources can be reduced by avoiding the processing associated with inefficient navigation of a UI and inadvertent or incorrect user input, as compared to previous solutions. Other technical benefits not specifically mentioned herein can also be realized through implementations of the disclosed subject matter.

Those skilled in the art will recognize that the subject matter disclosed herein can be implemented with various types of computing systems and modules, at least some of which are described in detail below. Those skilled in the art will also appreciate that the subject matter described herein can be practiced with other computer system configurations, including hand-held devices, multiprocessor systems, microprocessor-based or programmable consumer electronics, computing or processing systems embedded in devices (such as wearables, automobiles, home automation etc.), computing or processing systems embedded in devices (such as wearable computing devices, automobiles, home automation etc.), and the like.

In the following detailed description, references are made to the accompanying drawings that form a part hereof, and which are shown by way of illustration specific configurations or examples. Referring now to the drawings, in which like numerals represent like elements throughout the several FIGS., aspects of various technologies for opportunistically moving UI components to enhance a predicted user workflow will be described.

Prior to discussing particular aspects of the disclosed technologies, a brief introduction to foldable computing devices (which might be referred to herein as "foldable devices") will be provided. As discussed briefly above, foldable devices include multiple screen form factor devices (which might be referred to herein as "hinged devices") that have two physical display screens joined together with a hinge or other equivalent mechanism. By manipulating the orientation of the display screens with respect to one another by way of the hinge, such devices can be configured in a multitude of postures, some of which are described in greater detail below with regard to FIGS. 1A and 1B.

Foldable devices also refer to computing devices having a bendable display screen (which might be referred to herein as "bendable devices"), such as computing devices utilizing flexible screen technology. When such a device is not bent, it presents a single display surface. When bent, these devices present a single display surface with a crease in the middle. Bendable devices can also be configured in a multitude of postures by varying the amount of bend, some of which are also described in greater detail below with reference to FIGS. 1A and 1B.

The display screens of foldable computing devices can be touch sensitive, thereby enabling such devices to recognize touch or stylus input, presses, swipes, and other types of gestures, some of which are described below. These devices can also, of course, be used while being held in various orientations, some of which are described below with regard to FIGS. 1A and 1B.

Figure 1A:
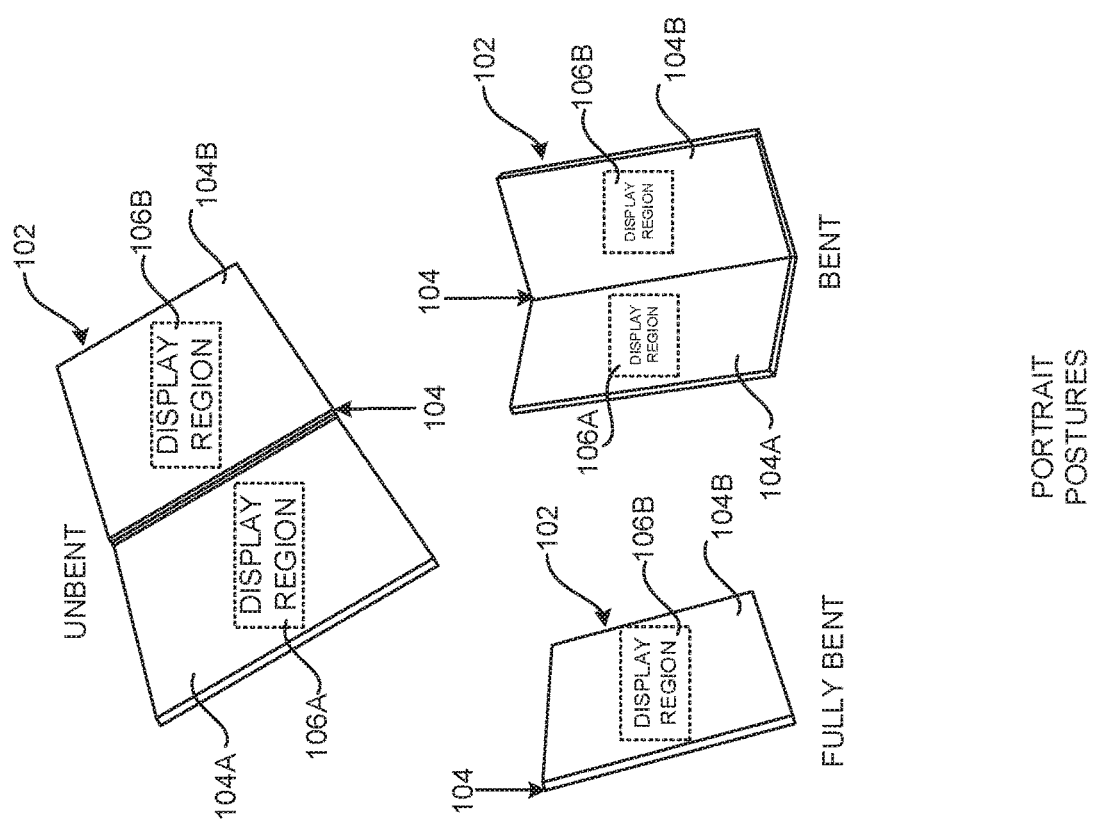

Referring now to FIGS. 1A and 1B, details regarding several postures for foldable display devices will be described. The examples shown in FIGS. 1A and 1B illustrate some possible postures for a hinged device 102. It is to be appreciated, however, that the illustrated postures generally apply to bendable devices as well.

As shown in FIG. 1A, a hinged device 102 can be configured in multiple postures by varying the angle of the hinge 104 that connects two display devices 104A and 104B (which might be referred to herein as "displays"). In FIG. 1A, for instance, the hinged device 102 is shown in a flat posture where the display screens 104A and 104B are parallel to one another in portrait orientation, a completely open posture where only a single display 104B is visible in portrait orientation, and partially open posture in portrait orientation where the hinge 104 is bent. The hinged device 102 can also be configured in a closed posture (not shown) where neither display screen is visible.

In FIG. 1B, the hinged device 102 is shown in a flat posture where the display screens 104A and 104B are in landscape orientation, in tented and propped postures where the angle of the hinge 104 enables the hinged device 102 to stand on its own and present a single display 104A, and in a partially open posture where one display 104A is flat and the other display 104B is at least partially upright, thereby forming a configuration similar to a traditional laptop computer. In this regard, it is to be appreciated that the postures illustrated in FIGS. 1A and 1B are illustrative and that other postures might also be possible.

As also shown in FIGS. 1A and 1B, the display device 104A provides a first display region 106A that encompasses all or a part of the display 104A. Similarly, the display device 104B provides a second display region 106B that encompasses all or a part of the display 104B. The first display region 106A and the second display region 106B can present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. Various uses of the display regions 106A and 106B provided by the hinged device 102 will be described below.

Figure 2B:
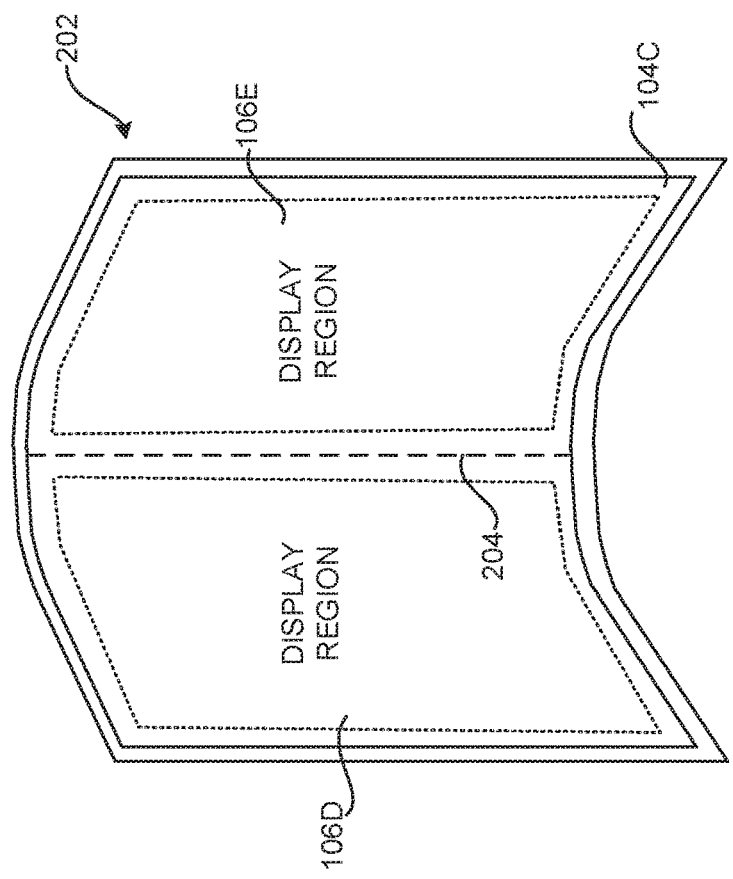
Figure 2A:
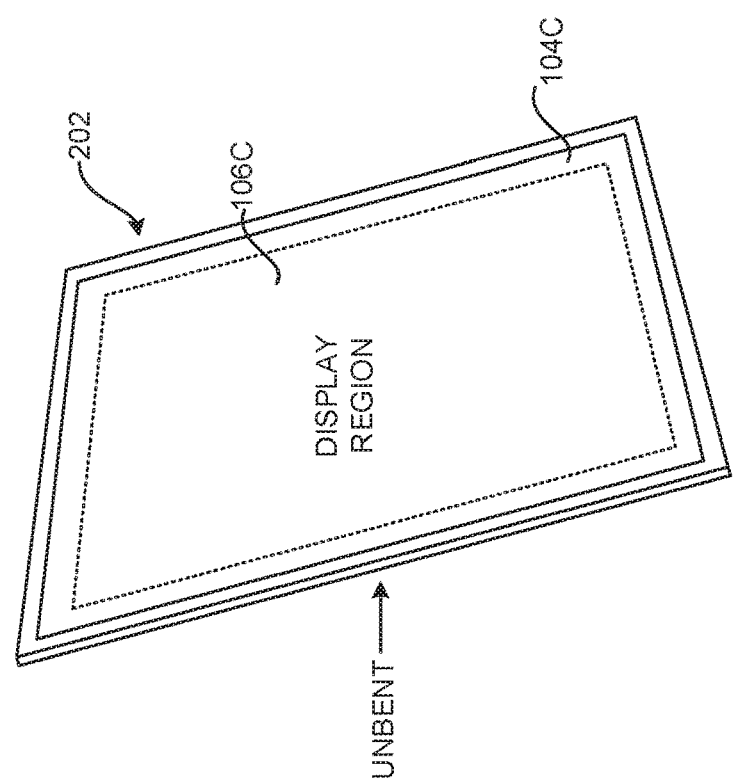

Referring now to FIGS. 2A and 2B, details will be provided regarding the configuration and operation of a bendable device 202. As mentioned above, a bendable device 202 can also be configured in postures the same as or similar to those described above with regard to FIGS. 1A and 1B. For instance, in the example posture shown in FIG. 2B, the bendable device 202 has been placed in an unbent position, thereby presenting the entirety of the display 104C. The bendable device 202 can also be configured in a closed posture where neither display region is visible.

In the example posture shown in FIGS. 2B and 2C, the bendable device 202 has been partially bent similar to the partially open posture shown in FIGS. 1A and 1B. In particular, in the example shown in FIG. 2B, the bendable device 202 has been bent while the screen 104C is in a landscape orientation. In the example shown in FIG. 2C, the device 202 has been bent while the screen 104C is in portrait orientation.

When the bendable device 202 is bent, a crease or "fold" 204 is formed in the display 104C. The term "fold" as used herein might refer to the area where a foldable device is folded (i.e. the area of a hinge 104 on a hinged device 102 or the area where the display of a bendable device 202 bends).

As in the case of a hinged device 102, the bendable device 202 can also provide one or more display regions. However, in the case of a bendable device 202, the number of available display regions can vary based upon the posture of the device. For instance, a single display region 106C is provided when the bendable device 202 is in an unbent state as shown in FIG. 2A. Two display regions 106D and 106E can be provided on the display 104C when the bendable device 202 is in a bent posture, such as that shown in FIG. 2B. Various details regarding the configuration and use of the display regions 106 (which are rendered using dotted lines throughout the FIGS.) provided by foldable devices are provided below.

Referring now to FIGS. 3A and 3B, details will be provided regarding various adaptations for multiple screen modes of bendable devices 202. It is to be appreciated that the bendable device 202 shown in FIGS. 3A and 3B (and FIGS. 4-9) have been shown two-dimensionally for ease of illustration. This is not, however, intended to indicate that the bendable device 202 is lying flat.

Prior to discussing FIGS. 3A and 3B and the other FIGS., it is also to be appreciated that certain relative terms (e.g. height, width, top, bottom, left, right) might be utilized herein to describe the configuration of the displays and display regions described herein. In this regard, it is to also be appreciated that these terms have been utilized herein for ease of discussion and are not to limit the configuration of the display regions or UI elements. Other terms can be utilized to describe the displays, display regions, UI elements, and their spatial relationships to one another It is also to be appreciated that although generally described separately, the various embodiments described briefly above and in further detail below can be utilized in combination with one another.

As discussed briefly above, foldable devices can be manipulated between a portrait orientation as shown in FIG. 3A and a landscape orientation as shown in FIG. 3B. As also discussed above, these devices can be bent to various degrees by modifying the angle of a hinge. In the case of a hinged device 102, the hinge 104 is typically visible from the front and rear of the device. In the case of a bendable device 202, the hinge is not visible from the front of the device since the bendable display 104C encompasses the entirety of the device. Additionally, in both types of devices the hinge can be configured with a sensor capable of measuring the angle of bend of the hinge (i.e. the "hinge angle") and providing data to a processor of the device that specifies the hinge angle.

In one embodiment, a bendable device 202 is configured to dynamically transition between interaction modes that are optimized for single and multiple display regions 106 based on the hinge angle of the device 202. For example, and without limitation, a bendable device 202 might behave as if it has a single display screen and provide a single display region 106C when the device 202 is unbent. In this example, the display region 106C extends across the entirety of the display, including the area of the device 202 where the crease 204 would appear when bent. This interaction mode might be referred to herein as the "single display region mode."

A bendable device 202 might also behave as a dual screen device and provide multiple display regions 106D and 106E when the device 202 is bent. In the illustrated example, the display region 106D encompasses the entirety of the left side of the device 202 and the display region 106E encompasses the entirety of the right side of the device 202. This interaction mode might be referred to herein as "multiple display region mode." If the device 202 is in an unbent posture and transitions to a bent posture, the device 202 will transition from single display region mode to multiple display region mode. Similarly, if the device 202 is in a bent posture and transitions to an unbent posture, the device 202 will transition from multiple display region mode to single display region mode.

In one embodiment, an operating system presents a taskbar 302 across the bottom of the display screen of a bendable device 202. The taskbar 302 can provide various types of functionality including, but not limited to, launching applications, displaying notifications, displaying UI controls for configuring aspects of the operation of a device (e.g. changing the volume level), searching, viewing available applications, displaying the time, initiating a view of currently available windows, and others.

In the embodiment shown in FIG. 3A, the bendable device 202 displays the taskbar 302 across the entirety of the bottom edge of the display region 106C while in the single display region mode. When the device 202 transitions from single display region mode to multiple display region mode, the device 202 modifies the display of the taskbar 302 such that it encompasses only the bottom edge of one of the regions 106D and 106E. In the example shown in FIG. 3B, the taskbar 302 spans the bottom edge of the display region 106D, however, the taskbar 302 might be presented in the display region 106E in a similar manner in other embodiments. In the multiple display region mode, the taskbar 302 is often presented in either display region 106D or 106E, but taskbar 302 may also be presented across both display regions 106D and 106E at the same time.

When the device 202 is operating in the multiple display region mode, the UI presented by applications launched from the taskbar 302 will appear by default in the same display region as the taskbar 302. For instance, if the taskbar 302 is displayed in the display region 106D and utilized to launch an application, the UI provided by the launched application will be shown in the display region 106D. Similarly, if the taskbar 302 is displayed in the display region 106E and utilized to launch an application, the UI provided by the launched application will be shown in the display region 106E.

As also illustrated in FIG. 3B, an artificial hardware seam 304 can be presented at the approximate location of the fold 204 when the device 202 is operating in multiple display region mode. In one embodiment, the artificial hardware seam 304 is a vertical bar displayed on the display screen of the device 202 between the display regions 106D and 106E.

Selecting a Rendering Mode for a UI Component Based on Content Occlusion

Figure 4:
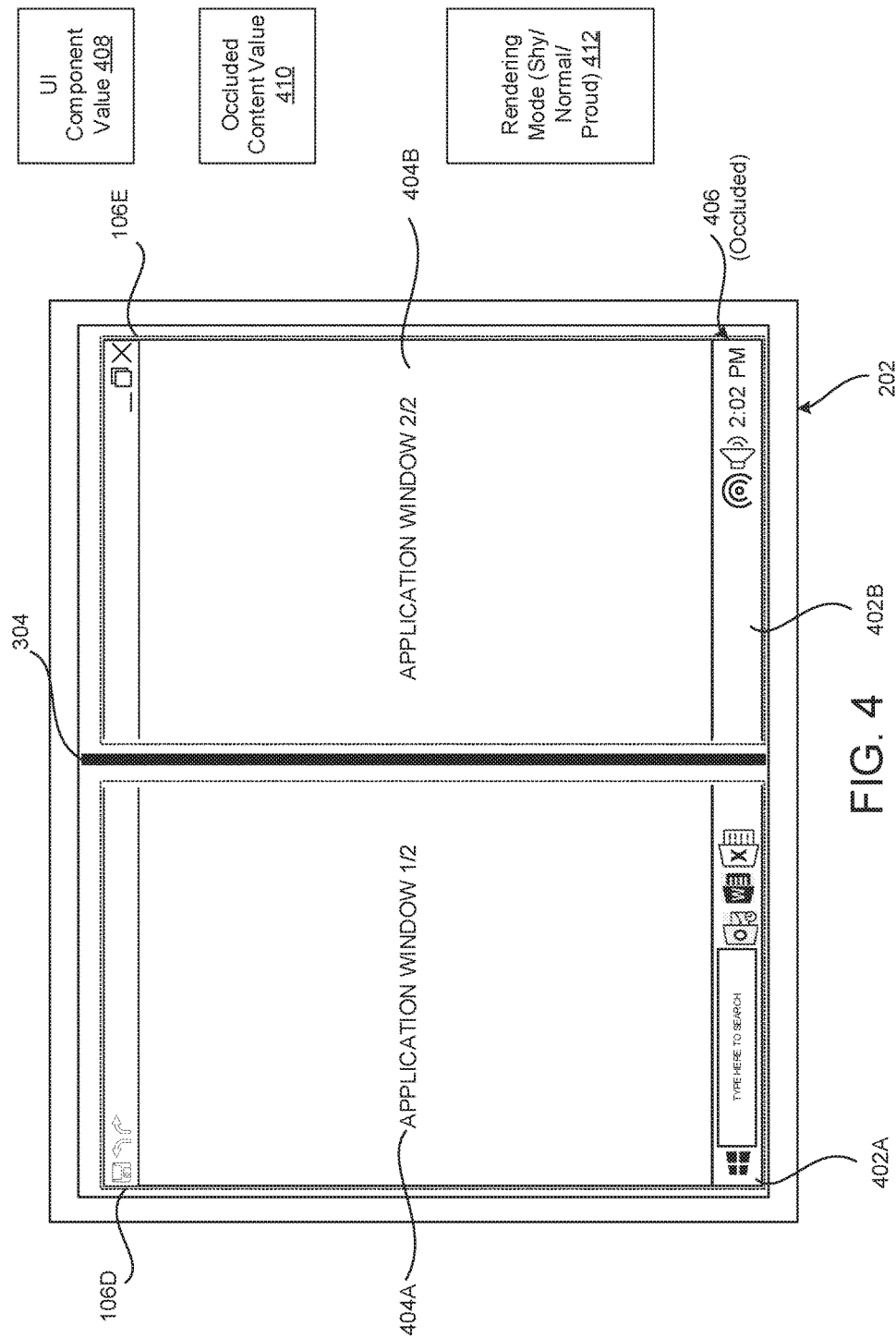
FIG. 4 is a device user interface diagram illustrating aspects of a window of an application that spans both regions of a foldable device and a taskbar displayed using a 'normal' rendering mode that occludes a bottom portion of the window of the application, according to one embodiment.

Turning now to FIG. 4, details will be provided regarding technologies for determining a UI rendering mode for a UI component based on comparison of a score of the UI component and a score of any existing UI that would be occluded by the UI component if displayed. "Existing UI" refers to a preexisting window of an application, dialog box, or other UI content. Existing UI may or may not be occluded by the UI component. For example, some of the existing UI may not be occluded if part of the UI component is made transparent. Existing UI may also not be occluded if the UI component is displayed in a different location. "Occluded UI" refers to existing UI that is actually occluded by the UI component.

In one configuration, foldable device 102 computes a score associated with the UI component and a score associated with any existing UI. In some configurations, a score represents a predicted amount of utility or other benefit that the UI component will provide to a user. For example, foldable device 102 may assign higher scores to UI components that provide information to the user, or that enable the user to perform a function. The urgency of the information and the importance of the function may also affect the score.

A score may be calculated based on historical usage data of the UI component. For example, foldable device 102 may assign a higher score to a UI component that has been interacted with more than an average UI component. Similarly, foldable device 102 may assign a lower score to a UI component that has been dismissed, minimized, or moved to a peripheral location on the display more than an average UI component.

Foldable device 102 may then vary the appearance of the UI component based on whether, and to what extent, the score of the UI component exceeds the score of the existing UI. The foldable device may vary the appearance of a UI component by displaying the UI component using a particular rendering mode. A rendering mode determines how the UI component is displayed, e.g. what sub-components of the UI component are selected for display, what level of opacity is applied to the UI component, whether the UI component auto-hides itself after a period of inactivity, etc.

When the difference between the scores is large and positive, i.e. when the score associated with the UI component is greater than the score associated with the existing UI by at least a defined amount, foldable device 102 may give the UI component a high prominence by displaying the UI component using a proud rendering mode.

When the difference is negative, i.e. the score of the UI component is less than the score of the occluded UI, then foldable device 102 may give the UI component a low prominence by displaying the UI component using a shy rendering mode. When the difference between the scores does not reach either of these thresholds—i.e. the score associated with the UI component to be displayed is greater than the score associated with the existing UI, but by less than the defined amount, foldable device 102 may give the UI component a medium prominence by displaying the UI component using a normal rendering mode.

While 'normal', 'shy', and 'proud' rendering modes are used throughout this document, these names and delineations are examples—other types of rendering modes that affect how a UI component renders and responds to user input are similarly contemplated.

In one particular example, foldable device 102 may display taskbar 302 using a normal rendering mode in response to determining that the score associated with taskbar 302 is greater than the score associated with the existing UI 406 of the application window 404, but by less than the defined amount. The score of taskbar 302 may exceed the score of existing UI 406 of application window 404 for a number of reasons. For example, existing UI 406 may display non-essential information, or no information at all, causing a lower score.

Furthermore, taskbar 302 may provide functionality, e.g. switching between running applications, that has been used more often than other UI components, causing an increased score. Taskbar 302 may also display intrinsically high value information, e.g. security information, login information, battery life information, etc., further causing an increased score. In some embodiments, when taskbar 302 is displayed using a normal rendering mode, taskbar 302 displays a complete set of standard icons and other sub-components. Additionally, or alternatively, when taskbar 302 is displayed using a normal rendering mode, taskbar 302 may be set to full opacity.

In some configurations, determining that taskbar 302 is associated with a higher score than the occluding UI may include identifying one or more portions of application window 404 that will be occluded and comparing the scores of these portions to the scores of the taskbar 302. Each application window may be associated with a predetermined list of portions, e.g. edge portions, corner portions, or the like, and a corresponding list of scores for each predetermined portion. The list of portions may be universal to all applications, or particular to specific applications or types of applications. Similarly, the list of scores associated with each portion may be universal to all applications or particular to specific applications or application types. The predetermined list of portions and corresponding scores may be hand-selected by a developer of application window 404, the developer of occluding UI components such as taskbar 302, or a user.

Portions of application window 404 may also be automatically identified based on historical user interface interactions, such as a history of where within an application window the mouse cursor tends to be, where mouse clicks tend to be performed, etc. For applications that allow text editing, portions may be identified as regions where an insertion point (also referred to as a 'caret') tends to be located, or where the insertion point tends to be located when keyboard input is received. For example, foldable device 102 may identify a cluster of locations where user interactions occur and define a portion of the application window as a geometric shape that encloses the cluster. A cluster may be a set of user interaction locations having at least a defined density, e.g. at least 250 interactions per square inch per hour.

In another embodiment, a portion may be automatically identified as one or more windows, dialog boxes, controls, or other user interface elements within the application window. For example, if foldable device 102 determines that a significant amount of mouse input is received within a status bar at the bottom of the application window, the entire status bar UI element may be considered a portion of the application window.

In some configurations, portions of the application window or the values associated with those portions may change based on the location, size, and/or shape of the application window 404. For example, an application window 404 may have a low-value portion along the bottom when a height of the application window 404 is greater than a defined amount, or if the application window 404 is maximized. However, the same application window may not have a low-value portion along the bottom if the application window is smaller than the defined amount, e.g. when all of application window 404 displays high value content. In some configurations, historical user interaction data may be analyzed to determine the defined height at which a region becomes high or low valued.

Regardless of how portions of the application window are determined, historical data collected from user interactions with application window 404 may be programmatically analyzed to determine which portions have low, average, and high scores for a particular user. For example, a history of user interface interactions similar to those discussed above with regard to identifying portions may be analyzed to determine how frequently a current user has been interacting with the portions. Frequency of interaction may then be used to determine a score of a given portion. The scores of portions of application windows may be calculated based on recent interactions made by the user or based on the user's entire user interaction history.

In some embodiments, portions of the application window may be assigned a score based on an analysis of content within the portions. For example, text that is repeated throughout or across documents may be considered to have a low score, as the repeated text is likely to be boilerplate. Text from different portions of the application window may also be analyzed by a machine learning classifier to identify a score of the portion. In some configurations, a content-based analysis may be combined with a user-interaction history analysis to assign a score to portions of an application window.

FIG. 4 illustrates a UI component, taskbar 302, displayed using a 'normal' rendering mode. In some configurations, a 'normal' rendering mode is a rendering mode that applies a default configuration, including a level of opacity, number and type of constituent UI sub-components, and the like. While the specifics of what is 'normal' may be different for different UI components, many UI components displayed using a 'normal' rendering mode will be nearly or completely opaque. 'Normal' rendering modes will also often expose functionality with directly accessible icons, as opposed to moving icons to a menu that must first be activated before accessing the icon. 'Normal' rendering modes will also often remain fixed in location, i.e. without automatically collapsing or otherwise hiding after a defined period of time of inactivity.

While taskbar 302 is used as an example of a UI component in FIG. 4, other UI components are similarly contemplated, including a task launching menu (e.g. 'Start Menu'), pop-up dialog boxes, security confirmation screens, pinned or 'always on top' applications, run dialog boxes, performance monitors, task managers, etc. Similarly, while application window 404 is displayed across regions 106D and 106E, a 'normal' rendering mode may also be used when taskbar 302 occludes an application window displayed in a single region.

Figure 5:
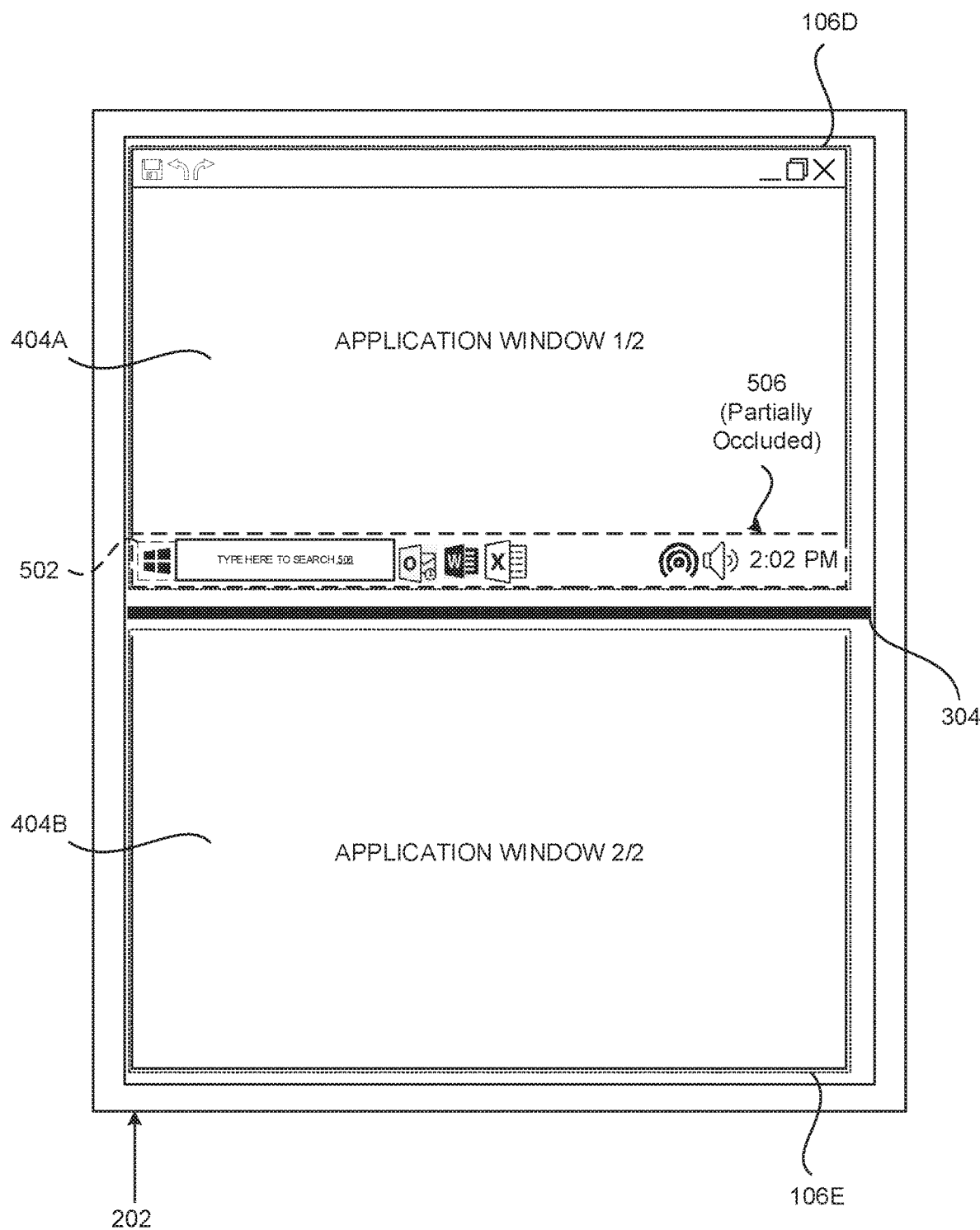
FIG. 5 is a device user interface diagram illustrating aspects of a window of an application that spans both regions of a foldable device and a taskbar displayed using a 'shy' rendering mode that occludes a middle portion of the window of the application, according to one embodiment.

FIG. 5 is a device user interface diagram illustrating aspects of taskbar 502 displayed using a 'shy' rendering mode that occludes a middle portion 506 of application window 404. A 'shy' rendering mode may be selected when foldable device 102 determines that the UI component would occlude central, important, or frequently used information in the existing UI. A shy rendering mode may cause some or all of a UI component to be transparent or translucent. A UI component displayed using a shy rendering mode may also present a minimized user interface, e.g. a user interface that places icons in menus, uses smaller versions of icons, etc. A UI component displayed using a shy rendering mode may also be transient, e.g. having a user interface that automatically hides itself Foldable device 102 may display taskbar 502 using a shy rendering mode based on a determination that a score associated with taskbar 502 is less than a score associated with the existing UI, e.g. a score associated with portion 506 of application 404. Foldable device 102 may make this determination based on an analysis similar to the analysis described above in conjunction with FIG. 4, e.g. by identifying a list of portions of application window 404 that would be occluded by the UI component, and comparing the scores of each portion to the score of taskbar 502. If one or more of the occluded portions have a score higher than the score of taskbar 502, then taskbar 502 may be displayed using a shy rendering mode.

In some configurations, a portion of a UI component may be displayed using a normal rendering mode while another portion of the same UI component may be displayed using a shy rendering mode. For example, if portions of taskbar 502 have a higher score than portions of the existing UI, those portions of taskbar 502 may be displayed using a normal rendering mode. However, if other portions of taskbar 502 have a lower score than portions of the existing UI, these other portions of the taskbar 502 may be displayed using a shy rendering mode.

Taskbar 502 is but one example of a UI component that may be displayed using a shy rendering mode—other UI components and other types of UI components, e.g. windows, menus, icons, dialog boxes, etc., may similarly be displayed using a shy rendering mode.

In some configurations, when determining a score associated with a UI component relative to a score associated with the existing UI, a negative impact of the occlusion itself may reduce the score associated with the UI component. In this way, a UI component associated with a greater score than the score associated with the existing UI may still be displayed using a shy mode. For example, if UI components and portions of existing UI are scored on a scale of 1-100, with 1 being little to no value and 100 being the upmost value, a UI component with a score of 55 would ordinarily be set to a normal rendering mode if it occludes existing UI associated with a score of 53. However, if foldable device 102 determines that the occlusion itself reduces the score of the UI component by 5, for an effective score of 50, then the UI component would be displayed using a shy rendering mode despite nominally having a greater score than the existing content.

A shy rendering mode may cause a UI component like taskbar 502 to be translucent, as depicted by the dashed lines in FIG. 5. By displaying taskbar 502 translucently, foldable device 102 allows existing UI 506 to also be visible while maintaining the normal number and type of sub-components of taskbar 502. As illustrated, taskbar 502 includes the same number of icons and other sub-components as taskbar 302, which was rendered normally.

In some configurations, the level of translucence may be set based on a degree to which the score associated with the existing UI is greater than the score associated with the UI component. Translucency may be set as a percentage of the translucent image attributable to the existing UI. For example, a translucency percentage of 70% means that 70% of the blend between UI component and existing UI comes from the existing UI. A translucency percentage of 70% may be considered high, reserved for instances where the existing UI has a significantly higher value than the UI component.

For example, if the UI component has a score of 20 while the existing UI has a score of 65, for a net score difference of 45, foldable device 102 may set the translucency of the UI component to 70%. A smaller difference in score, e.g. a UI component with a score of 55 and an existing UI score of 65, may correspond to a translucency of 50%, as the existing UI and the UI component have comparable scores.

Displaying a UI component like taskbar 502 using a shy rendering mode may also cause taskbar 502 to be partially transparent, i.e. sub-components of taskbar 502 may be rendered as outlines, allowing the existing UI to appear within the outlines. For example, search box 508 may allow existing UI to be completely visible apart from the outline of the search box and any text contained therein.

Figure 6:
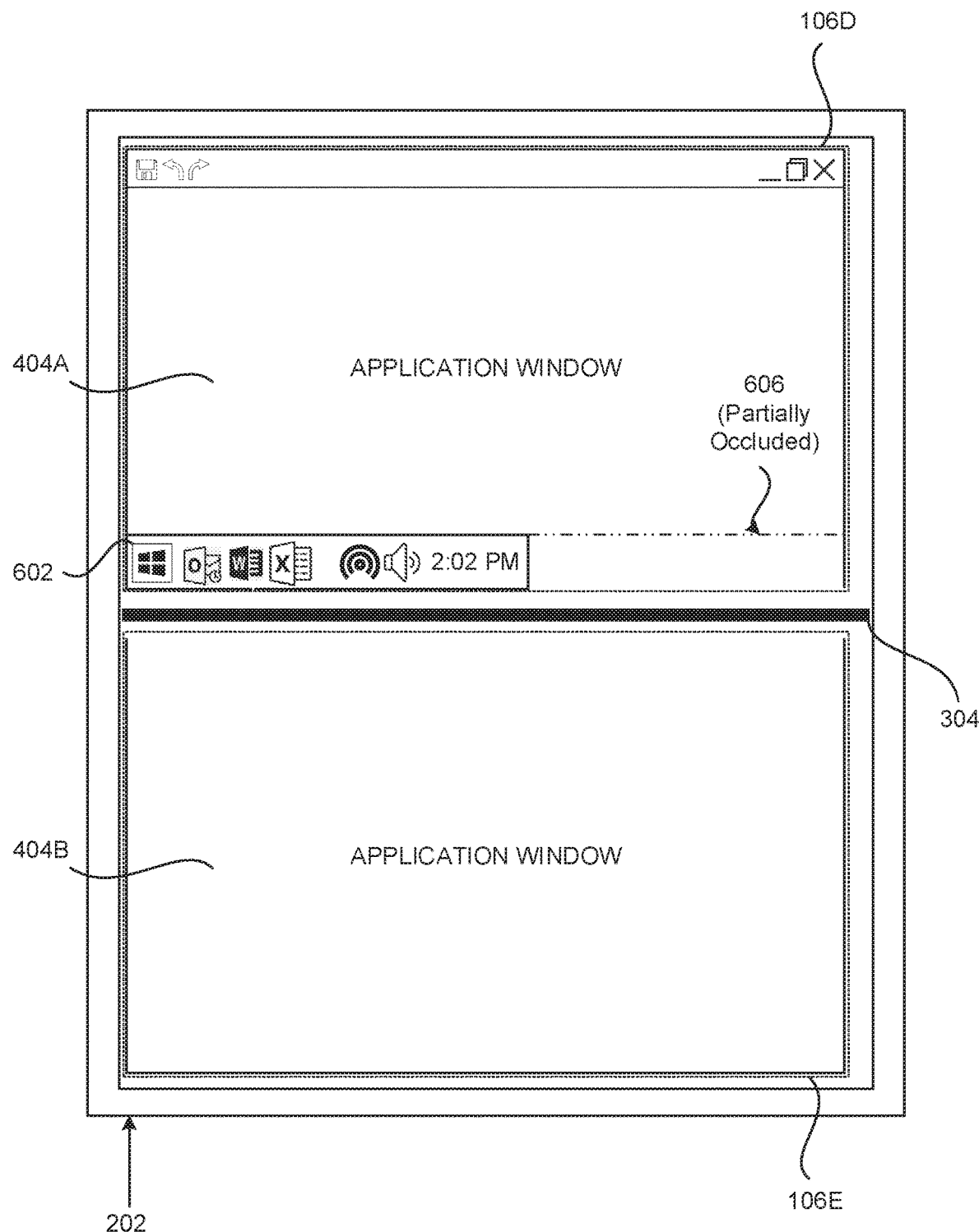
FIG. 6 is a device user interface diagram illustrating aspects of a window of an application that spans both regions of a foldable device and a taskbar displayed using a 'shy' rendering mode that occludes a middle portion of the window of the application, according to one embodiment.

Turning now to FIG. 6, details will be provided regarding application window 404 that spans both regions 106 of foldable device 102 and taskbar 602 displayed using a 'shy' rendering mode that occludes a middle portion 606 of application window 404. The shy rendering mode depicted in FIG. 6 puts taskbar 602 into a condensed mode, omitting non-essential sub-components, minimizing the size of sub-components, placing sub-components in menus and tabs, and otherwise taking measures to reduce the overall size of taskbar 602. The condensed mode of taskbar 602 may be rendered opaquely, such that some of application window 404 remains occluded.

In some configurations, taskbar 602 may also be made translucent. Other techniques for displaying a UI component using a shy rendering mode include automatically hiding taskbar 602, reducing taskbar 602 to a single icon that can be activated to show some or all of taskbar 602, and the like. For example, taskbar 602 may collapse to a single icon after a defined period of not being used. Foldable device 102 may detect a touch on the single icon, and in response, restore some or all of taskbar 602.

Figure 7:
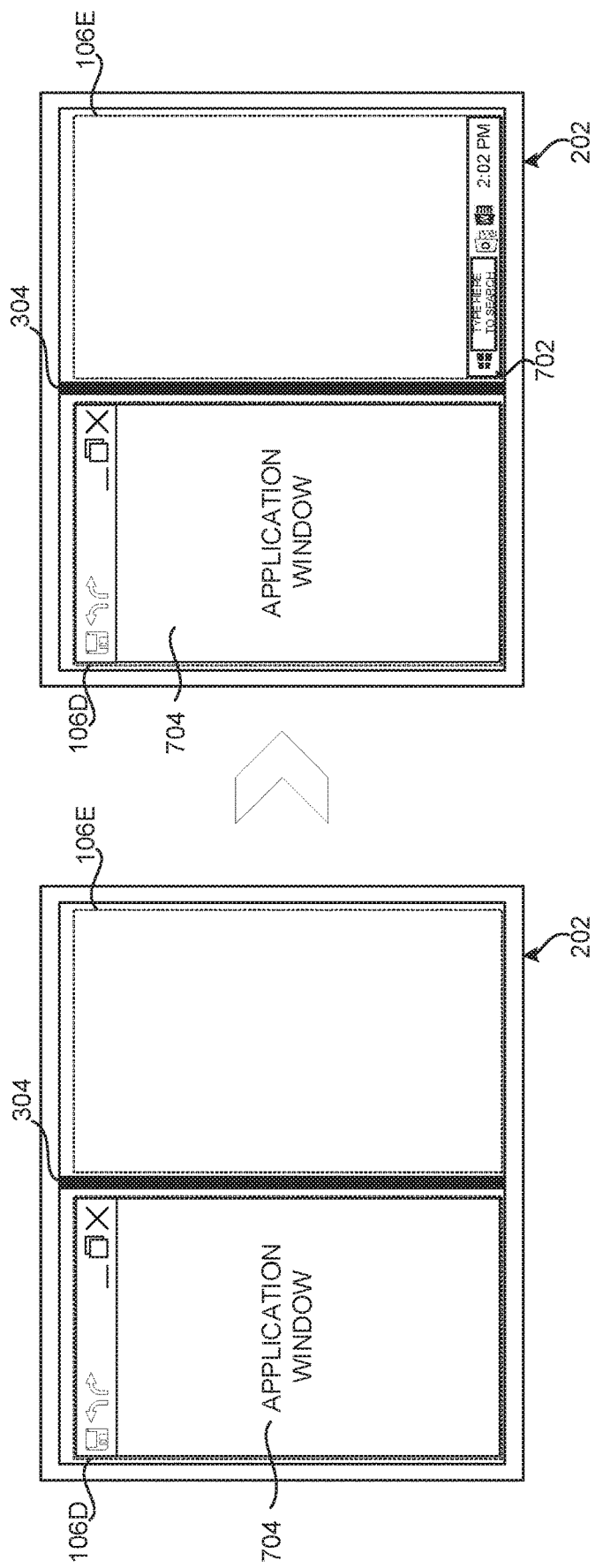
FIG. 7 is a device user interface diagram illustrating aspects of the operation of a window of an application that spans one region of a foldable device and a taskbar that is displayed using a 'proud' rendering mode and that appears unprompted in an empty display region, according to one embodiment.

Turning now to FIG. 7, details will be provided regarding application window 704 that spans region 106D of foldable device 102 and taskbar 702 that is displayed using a 'proud' rendering mode and that appears unprompted in empty display region 106E. In some embodiments, when a UI component such as taskbar 702 is displayed using a 'proud' rendering mode, the UI component displays the UI component using an expanded mode, in contrast to using a normal mode or an auto-hiding mode. An expanded mode may fill an unused portion of region 106D, such that the proud UI component takes up as much space as it needs without causing occlusion. As depicted in FIG. 7, foldable device 102 determines that there would be no occlusion if taskbar 702 were to appear in region 106E, which is empty.

Foldable device 102 may determine that the score associated with taskbar 702 is greater than the score associated with the empty space of region 106E. For example, since application windows are by default located in the display region of the UI component used to launch them, the score associated with displaying taskbar 702 in region 106E may be based in part on making it convenient for a user to launch a second application having a window in region 106E for side-by-side operation with application window 704. This score may be greater than the score of empty space in region 106E—i.e. this score may be greater than the score of not disturbing the user with the unsolicited appearance of taskbar 702. Foldable device 102 may determine that a user would value launching a second application having a window in a side-by-side operation with application window 704 based on how often application window 704 and the second application window were historically used in a side-by-side configuration.

In some configurations, while spontaneously displaying taskbar 702 using a proud rendering mode, taskbar 702 may display, highlight, or otherwise call attention to other applications that have historically been executed concurrently with application window 704, e.g. that have historically been executed with application window 704 in a side-by-side mode. For example, taskbar 702 may include 'quick-launch' icons for applications associated with application window 704. In some configurations, the 'quick-launch' icons provided in the proud rendering mode may not be the icons provided by a taskbar in a normal or shy rendering mode.

Furthermore, the 'quick-launch' icons provided in the proud rendering mode may vary based on the application window 704, the type of application that renders application window 704, an action recently taken by a user in application window 704, etc. This enables a user of foldable device 102 a convenient means to launch an application into region 106E when the application is commonly displayed side-by-side with application window 704. In some configurations, foldable device 102 periodically analyzes potential UI components like taskbar 702 to determine if any of the potential UI components have a high enough score to warrant proactively displaying themselves without user input.

Displaying taskbar 702 in empty space when a user is predicted to want to launch another application into region 106E is one reason to set the UI component into a proud rendering mode. Other UI components, such as an application launch (e.g. 'Start' menu) are similarly contemplated, as are other criteria for determining when the score associated with displaying the UI component using a proud rendering mode is greater than not displaying the UI component using the proud rendering mode. It is further considered that UI components displayed using other rendering modes, e.g. shy or normal, may be displayed in a non-default location such as a different location on the default display region or a location on a different display region.

In some configurations, in addition to considering actual occlusion created by a UI component over existing UI, foldable device 102 may predict where a recently launched application window will be displayed and how the user will interact with the recently launched application window based on a task context, i.e. the number, type, and location of already running applications.

For example, an application window for viewing video content may have one task context for browsing videos, and a different task context for watching a full screen video. A word processing application window may have a first task context for editing a document, a second task context for viewing a document, a third task context for reviewing a document, etc. This task context information may be used to display a UI component in a particular rendering mode. For example, if the current task context and historical usage data indicate that a recently launched web browser may be used to view a full-screen video, any UI components that do overlap with or are expected to overlap with the recently launched application window may be set to a shy rendering mode.

Turning now to FIG. 8A, details will be provided regarding determining that a recently launched application window 806 (first depicted in FIG. 8C) and application window 704 are part of, or otherwise associated with, a user workflow. By detecting that application window 704 and application window 806 are part of a workflow, application window 806 and/or application window 704 may be located or relocated according to a layout defined by the workflow. In some configurations, application window 806 and/or application window 704 are displayed in different display regions because they are associated with a workflow. In other configurations, application window 806 and/or application window 704 are displayed in different display regions because they are associated with a workflow and they would overlap if not moved and/or displayed in their default location. The layout defined by the workflow may streamline user interaction with the foldable device, e.g. by reducing task switching between applications, reducing how often a user will move or resize a window, among other beneficial results described herein.

As depicted, application window 806 is launched from taskbar 302, which is located in region 106D. Specifically, application window 806 is launched in response to an activation 803 by pointer 804 of a UI element 802, which is located in region 106D.

Determining a Default Display Region for an Application Window 806

In some configurations, foldable device 102 may use the display region of the UI element 802 as the default display region of application window 806. As depicted, application window 806 is launched in response to activation of clock icon 802, which is located in display region 106D, and so the default display region of application window 806 is display region 106D.

In other configurations, foldable device 102 may use the display region of the activation as the default display region of application window 806. As depicted in FIG. 8A, activation 803 occurs in display region 106D, and so foldable device 102 would determine the default display region of application window 806 to be display region 106D. Determining the default display region of application window 806 based on the location of activation 803 may be useful if taskbar 302 or UI element 802 are not contained in a single display region.

In some configurations, activation 803 of UI element 802 may be triggered by a gesture that spans multiple display regions. In this case, foldable device 102 may use the display region where the gesture ended as the default display region of application window 806.

Application Window 806 may be Launched from an OS Shell Surface

Task bar 302 is a non-limiting example of an operating system (OS) shell surface that may be used to launch or otherwise display application window 806. An OS shell surface refers to any UI displayed by the operating system that is not part of an application. For example, the taskbar 302 is an OS shell surface because it is generated by the operating system and it is distinct from any applications. In contrast, a mouse cursor, the title bar of an application, maximize and minimize buttons, application borders, etc., may be generated by the operating system, but are intertwined with a particular application, and as such are not considered OS shell surfaces. Other examples of OS shell surfaces include security verification dialogs, lock screens, start menus, desktop icons, performance monitors, control panels, etc. Other examples of OS shell surfaces with a launching surface include a start menu, a 'run' dialog box from which a user may type in a name of an application to launch, etc.

Pointer 804 may be a finger, stylus, pen, or other device capable of interacting with the touch sensor of region 106D. Pointer 804 may also be a cursor controlled by a mouse, trackball, trackpad, or other pointing device. Pointer 804 may cause activation 803 by touching display region 106D. However, any other means of activating UI element 802 is similarly contemplated, including touching UI element 802 and holding for a defined period of time, hovering over UI element 802 for a defined period of time, a gesture that activates UI element 802, clicking a mouse button while a mouse cursor is over UI element 802, activating a keyboard shortcut while a UI element 802 is selected, etc.

In some configurations, pointer 804 may be used to enter a gesture that launches application window 806 without interacting with an OS shell surface. For example, pointer 804 may generate a gesture on a background portion of a desktop, causing application window 806 to be displayed. In this case, foldable device 102 will use the display region in which the gesture occurred as a default display region of application window 806. If the gesture occurred over multiple display regions, the default display region may be the display region in which the gesture ended.

Application window 806 may also be launched from an entry point located within existing application window 704. An entry point refers to a UI element such as a menu, icon, command line interface, etc. within the existing application window 704 that facilitates launching a new application window. For example, an email application may display an icon that allows a user to launch PowerPoint® in order to display an attached slide deck.

The default display region of an application window 806 launched from an entry point of existing application window 704 may be the display region that contains the existing application window 704. However, in other configurations, the default display region of the application window 806 may be a display region that does not contain existing application window 704. In other configurations, the default display region of the application window 806 may be a display region that is adjacent to the display region containing existing application window 704, a display region that is not adjacent to the display region containing existing application window 704, or a display region that is located in a particular direction or orientation from the display region containing existing application window 704. If the existing application window 704 spans multiple display regions, the default display region of the application window 806 may be determined to be the display region that contains the entry point. If the entry point spans multiple display regions, the default display region of the application window 806 may be determined to be the display region that received the user input that activated the entry point.

Identify if Application Window 806 is Associated with a Workflow

In response to activation 803, foldable device 102 may determine which workflows 816, if any, application window 806 is associated with. Some workflows are defined based on a historical analysis of activity data 814 associated with previous instances of application windows. The historical analysis may generate one or more lists of application window names 818. Then, in response to launching an application window, the one or more lists of application window names may be searched to determine if the recently launched application window is, with an existing application window, associated with a workflow. The historical analysis may include determining how often two application windows were displayed in different display regions at the same time, whether two application windows opened the same file or other resource, whether an application was moved to prevent occlusion of the other application window, etc.

Application windows may also be associated with a workflow based on how the application window 806 was launched. For example, if an application window is a child application window launched from a parent application window, then the application window and the parent application window are considered to be associated with a 'parent-child workflow.'

Application windows may also be associated with a workflow based on runtime behaviors of application windows, such as which data resources an application window is using. This determination may be made in real-time, as the application windows are running, and independent of a list of application windows that may be associated with a workflow.

Another technique for identifying which application windows are associated with a workflow is based on associations made by a user via the operating system, e.g. by identifying that two application windows have shortcuts located in the same folder, that two application windows are launched from the same shortcut, or that two application windows are simultaneously launched from the same group shortcut.

In some configurations, foldable device 102 periodically checks to determine if two or more application windows have become associated with a workflow. For example, application window 806 and existing application window 704 may not initially, upon the launch of application window 806, be determined to be associated with any workflows. However, a subsequent operation that loads a resource, such as a file load that opens a file into the application window 806 or the existing application window 704, may trigger a determination that a workflow associated with the application windows has been found. Other operations performed on or with an application window, or changes in application window state, may also trigger an association with a workflow, including window resizing, using a particular portion of an application window that is associated with a workflow, reaching a threshold amount or rate of user input or a type of user input, taking part in an inter-application window operation, such as "drag and drop" or "cut and paste", etc. Once the application windows have been determined to be associated with the workflow, one or more application windows may be moved from the default location 805 to a non-default display region 106E to prevent occlusion, establish a side-by-side application layout defined by the workflow, etc. In other configurations, once the application windows have been determined to be associated with the workflow, foldable device 102 may display the application window 806 in the default location 805 with the addition of a user interface element that, when activated, moves the application window 806 to a non-default display region 106E in accordance with the layout associated with the workflow. Foldable device 102 may add a similar user interface element existing application window 704 or any other application window associated with the workflow. For example, a button may be added to a title bar of application window 806 that when clicked, moves application window 806 to a non-default display region 106E according to the layout associated with the workflow.

Workflows Defined Based on a Historical Analysis of Application Windows

A historical analysis of activity data regarding application windows may be used to define a user workflow. The historical analysis may be used to create a list of application windows that, when found to be running at the same time, are associated with a workflow. The list of application windows may or may not include an order in which the application windows were launched. For example, a workflow may be defined as application window 704 followed by application window 806. In this case, the workflow may be identified if application window 806 is launched after, but not prior to, application window 704. In other configurations, the order in which the applications are launched does not matter.

In some configurations, the historical analysis includes:

How often and how long two application windows were running at the same time.

How often and how long two application windows were displayed side-by-side in different display regions at the same time.

How many times a user moved or resized an application window to be in a side-by-side configuration in different display regions as another application window.

How many times a user launched two or more application windows consecutively.

How many times a user launched an application window while an existing application window was the most recently active application window.

How many times a user copy and pasted or otherwise shared content between application windows.

How many times application windows used the same data resource, e.g. the same file, data table, web page, etc.

These criteria may be normalized and aggregated into a workflow criteria score. If, for a particular set (or sequence) of application windows, the workflow criteria score exceeds a defined threshold, the set (or sequence) or application windows may be associated with a workflow.

Some workflows defined based on a historical analysis of application windows may limit which existing application windows may be considered as part of a workflow. For example, some workflows may only consider a most recently active application window when determining whether application window 806 is part of a workflow. As such, even if a workflow criteria was satisfied by application window 806 and one or more of application windows that is not the most recently active, the workflow criteria would not be met. In some configurations, a workflow may allow any visible application window to be part of the workflow, while other workflows may allow any running application window to be part of the workflow.

The historical analysis may be based on application windows used locally on the foldable device 102. Additionally, or alternatively, the historical analysis may be based on application window usage aggregated from multiple users on multiple devices.

As discussed above, some workflows are identified by matching the names associated with existing application windows and a name of a recently launched application window, e.g. outlook.exe and photoviewer.exe, to the names in the lists of application window names. When a set of currently executing or just launched application windows have the names included in one of the lists of application window names, they are considered to be related to the workflow associated with that list. For example, if application window 704 is active (e.g. has focus) or was most recently active, then in response to activation 803, foldable device 102 may identify a workflow that includes application window 704 and application window 806.

Application window names may refer to a name of an executable program that generates the application window, e.g. outlook.exe may be the name for an application window that generated by outlook.exe to display an email inbox. An application window name may also refer to a particular window displayed by an executable, such as outlook.exe: main, which refers to the main window generated by outlook.exe, or outlook.exe:composemail, which refers to a window used to compose an email. Other name formats comprising similar information is also contemplated. Furthermore, application window names and/or the names of particular windows associated with an executable may be unique identifiers, e.g. globally unique identifiers (GUIDs), window handles (hWnds), etc.

If no workflow is found to include one or both of the application windows, foldable device 102 may select a workflow based on one or more application types. For example, if application window 704 is a word processor and application window 806 is a photo viewer, but no workflow includes the specific word processor of application window 704 and/or the specific photo viewer of application window 806, foldable device 102 may select a workflow compatible with a word processing application and/or a photo viewing application. In some embodiments, foldable device 102 may retrieve application type information from an "app store", online encyclopedia, or other source of application classification data.

Choosing from Multiple Workflows

When multiple workflows have their criteria met, workflow selection rules may be applied to select a particular workflow to use when responding to activation 803. For example, a workflow with more specific requirements may be selected over a workflow with more general requirements, such that a workflow compatible with a specific type of word processor, e.g. Microsoft Word®, will be selected over a workflow that is compatible with word processors generally. Similarly, workflows compatible with an active application window, or if there is no active application window, a most recently active application window, will be selected over workflows that are compatible with background applications. In some configurations, when there are still multiple workflows to choose from after applying the rules, explicit user selection, a most recently used workflow, selection at random, or other techniques may be employed to select a workflow.

Workflows Define how Application Windows are Arranged

In some configurations, in addition to defining which application windows are associated with a workflow, a workflow may define how the application windows are arranged. For example, a workflow may define that an email application window is placed in a first display region while a photo viewing application window is placed in a second display region. In some configurations, a workflow may define that if an already running application window is located in the first display region, then the other application window may be moved to the second display region. In this way, the already running application window remains where it was, reducing user confusion.

A workflow may also specify that two or more application windows are to be located in the same display region, in which case the workflow may specify how to arrange these application windows within the display region. For example, the application layout may specify that a web browser is to be displayed in a top half of the display region while a video sharing application is to be displayed in the bottom half of the display region.

In some configurations, a workflow may specify that an application window is to be located in a display region on a particular side of foldable device 102, such as a display region on the left side of foldable device 102. For example, a workflow comprising an email application and a photo viewing application may include an application layout that places the email application in a left display region while the photo viewing application is displayed in a right display region. Foldable device 102 may infer this layout when identifying workflows if one side of the application is used more than the other, e.g. if the right side of the email application is used more than the left side of the email application, then another application window associated with the workload can be placed adjacent to the side that is used more frequently. This minimizes user eyestrain by minimizing an average distance the user moves their visual focus when looking back and forth between the application windows.

Foldable device 102 may also infer a layout that preferentially locates particular application windows in particular display regions based on which hardware devices are utilized by which application windows, and based on which hardware devices are included in which display regions. For example, foldable device 102 may determine that a video conference application frequently uses a user-facing camera, and so when inferring workflow layouts that include the video conference application, foldable device 102 may locate the video conference application in a display region that includes a user-facing camera.

Figure 8B:
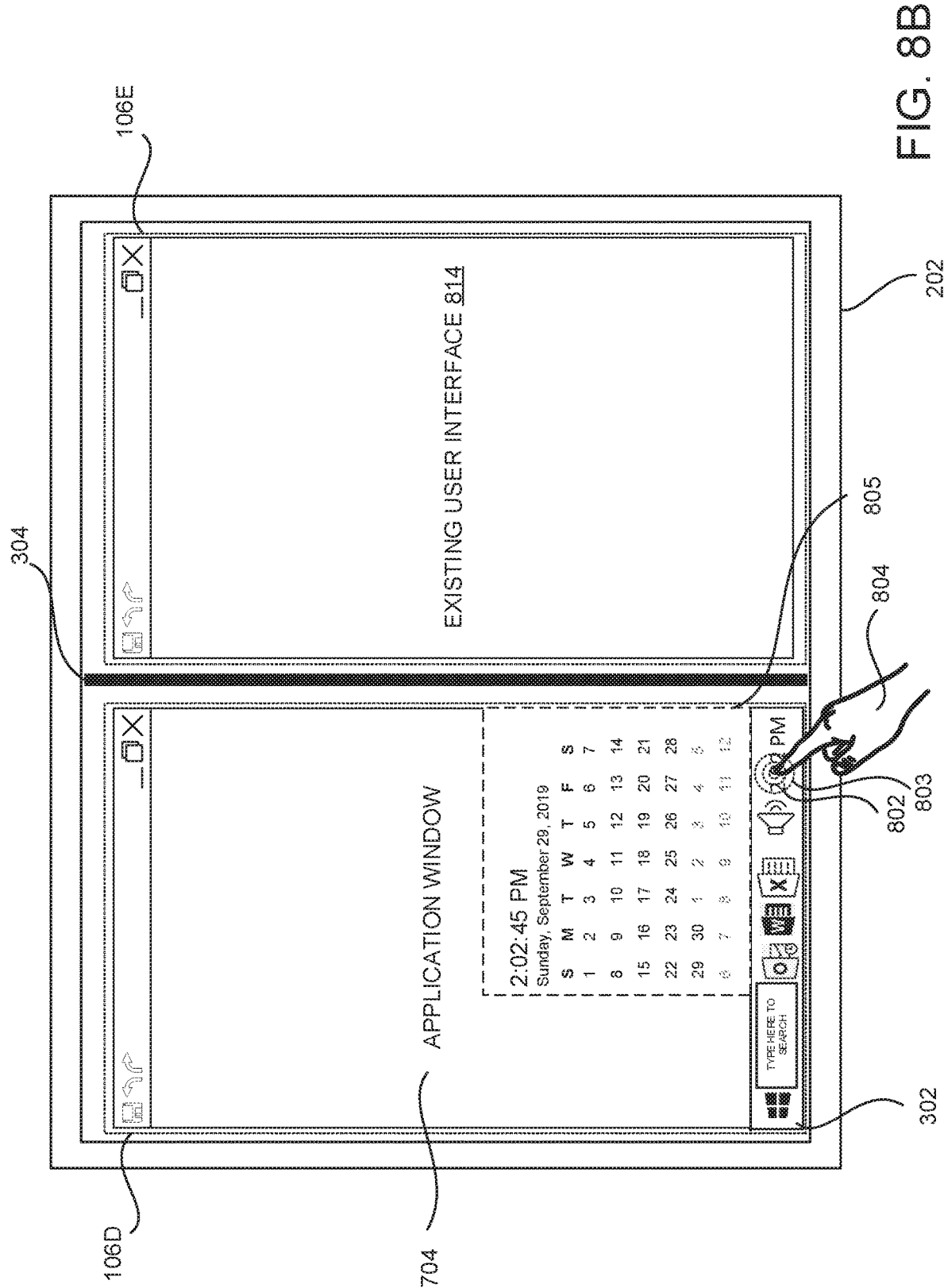
FIG. 8B is a device user interface diagram illustrating a default location of an application window, according to one embodiment.

Turning now to FIG. 8B, illustrated is a default location 805 of application window 806—i.e. the location where application window 806 would be displayed if the location was not altered due to being associated with a workflow. As depicted, default location 805 overlaps application window 704. However, in response to receiving touch 803 of icon 802, and after determining that application window 806 and application window 704 are associated with a workflow, foldable device 102 may display application window 806 in non-default display region 106E, thereby avoiding overlap with an application window that is part of the same workload, improving user interactivity. Foldable device 102 may display application window 806 in non-default display region 106E even if application window 806 occludes some or all of existing user interface 814, as the benefit to the user of laying out application windows associated with a workflow in a non-overlapping manner may outweigh the benefit of avoiding occlusion of existing user interface 814.

Determining which Application Window to Relocate

Foldable device 102 may select which application(s) of a user workflow to relocate to a non-default display region. In some configurations, the most recently launched application window 806 is moved to a non-default display region 106E, since a user may have grown accustomed to the location and size of the existing application window 704. Foldable device 102 is even less likely to move an existing application window 704 if a user has customized the size and/or location of the existing application window 704.

In other configurations, a smaller of the two application windows may be moved to a non-default display region 106E, as this minimizes the visual impact of the move. In other configurations, an existing application window is relocated, allowing the recently launched application window 806 to be displayed in a default location 106D, as this may decrease the likelihood that a user cannot find the recently launched application window 806.

In some configurations, the workflow itself may specify which application window, or which type of application, should be preferentially moved. This may reflect a user preference, or a default selection made by an application or OS vendor. For example, if a recently launched application window displays a word processing document, and an existing application window displays definitions found in word-processing documents, a user workflow associated with both application windows may indicate that the dictionary application should be preferentially moved while the word-processing application should be preferentially displayed in a default display region. This decision may be based on a judgment that the word processing application is the primary application, and so it would be more jarring to the user if it were moved.

Overriding a Relocation due to Existing UI

In some configurations, a decision to move one or more applications that are part of the same user workflow may be overridden. For example, if display region 106E is determined to contain existing UI with a particularly high score compared to application window 704, foldable device 102 may elect to not relocate application window 806 to display region 106E, even if application window 806 and application window 704 are part of the same user workflow. In this scenario, application window 806 may be displayed in default location 805, occluding at least a portion of application window 704.

Deprioritizing Existing UI in Non-Default Display Region

In some configurations, when moving or otherwise locating application window 806 on a nondefault display region, foldable device 102 may minimize, close, move to a third display region, or otherwise manipulate existing UI in the nondefault display region. For example, if a notetaking application is open in the destination display region (e.g. display region 106E), but is not part of the workflow, foldable device 102 may minimize the notetaking application before displaying application window 806 in the destination display region.

In some configurations, foldable device 102 comprises three or more display regions. In this scenario, foldable device 102 may select one of the two or more non-default display regions based on a score associated with the existing UI of each display region. For example, if foldable device 102 had a third display region 106F that was adjacent to display region 106D, then foldable device 102 may select a display region for application window 806 based on the scores associated with display regions 106E and 106F. Specifically, foldable device 102 may select the display region containing the existing UI with the lowest score. An empty display region may be assigned a score of '0'. In some configurations, foldable device 102 may deprioritize existing UI in a non-default display region 106E by moving the existing UI to a third display region 106F.

In some configurations, whether a particular application window is part of a particular workflow may be difficult to determine with confidence. For example, an application window may share a bare minimum amount of content to be associated with a 'shared content workflow.' Or, foldable device 102 may have less confidence that an application window is associated with a workflow when there is a shorter or smaller historical record of interaction between the underlying applications defined by the workflow. When there is a difference in the level of confidence with which an application window is associated with a workflow, the application window having the lowest level of confidence may be selected to be displayed in a non-default region.

Workflows may include Multiple Steps

In some configurations, a user workflow contains multiple steps involving multiple application windows. Each workflow step may perform a task, such as opening an email with a photo attachment, viewing the attached photo in a photo viewer, uploading the attached photo to a social media site using a purpose-built application, editing the photo in a photo editing application, etc. When a workflow utilizes more application windows than foldable device 102 has display regions, foldable device 102 may deprioritize application windows that have already been used to perform a step. Foldable device 102 may also deprioritize application windows used to perform steps estimated to have a lower importance. Foldable device 102 may also prioritize application windows used to perform workflow steps that have not yet been completed and/or workflow steps estimated to have a higher importance.

As depicted in FIG. 8C, aspects of the disclosed embodiments cause application window 806 to be displayed in a non-default display region, e.g. display region 106E. In some configurations, foldable device 102 displays application window 806 in display region 106E without regard to existing UI 812 in display region 106E—i.e. application window 806 will occlude existing UI 812. While FIG. 8C is depicted with a single window of existing UI 812, it is similarly contemplated that multiple windows of existing UI may be located in display region 106E, and that the analysis applied to a single window of existing UI 812 may be extrapolated to apply to multiple pieces of existing UI.

In some configurations, foldable device 102 may compare a score associated with displaying the existing UI 812 in display region 106E with a score associated with displaying application window 806 in display region 106E. As discussed above, a score may quantify a benefit to a user of a user interface. If the score associated with displaying the application window 806 is greater than the score associated with displaying existing UI 812, the application window 806 may be displayed in display region 106E, occluding the existing UI 812 when there is overlap. However, if the score associated with existing UI 812 is greater than the score associated with the application window 806, the application window 806 may be displayed in default location 805 of display region 106D. In other configurations, if the score associated with existing UI 812 is greater than the score associated with the application window 806, the application window 806 may be displayed in the non-default display region 106E underneath (i.e. occluded by) existing UI 812.

The scores associated with displaying application window 806 and existing UI 812 in display region 106E may be modified based on a number of criteria. For example, the score associated with displaying application window 806 may be increased based on a perceived benefit to the user of laying out existing application window 704 and application window 806 according to the workflow. In some configurations, the perceived benefit is hard coded in the workflow or provided by the end user. In other configurations, the perceived benefit may be calculated based on a confidence that application window 704 and application window 806 are part of the workflow. If there is high confidence that application window 704 and application window 806 are part of workflow 810, then it is more likely that the user would benefit from adopting the application layout defined in the workload, and so the score associated with displaying application window 806 in non-default display region 106E is increased accordingly.

Additionally, or alternatively, the perceived benefit may also be calculated based on how strongly application window 704 is connected to application window 806. For example, if the previous instances of application window 704 and application window 806 have a strong connection, e.g. historically they have been used side-by-side for many hours at a time, the perceived benefit of laying out application window 704 and application window 806 according to the workflow may be greater than if the previous instances were used together less frequently. In other configurations, the perceived benefit of laying out application window 704 and application window 806 according to the workflow may change based on the criteria by which the workflow was created. For example, a workflow identified based on historical usage, e.g. running side-by-side for a number of hours a day, may be associated with a higher perceived benefit than if the workflow was identified based on the underlying applications frequently using the same data resource.

In some configurations, the value of displaying application window 806 in region 106E may be discounted to account for potential user confusion when application window 806 is rendered in a non-default location. In these cases, even if the value of displaying application window 806 in region 106E is slightly higher than the value of displaying existing UI 812, foldable device 102 may display application window 806 in region 106D to account for the potential user confusion.

Turning now to FIG. 9A, details will be provided regarding an OS shell launching surface that facilitates launching an application window in a non-default display region. In some configurations, the OS shell launching surface is an application launching menu, e.g. a 'Start Menu' used by the Microsoft® Windows® operating system. However, other types of launching surfaces are similarly contemplated, including a taskbar, a run menu, a context menu (i.e. a 'right-click menu'), etc.

FIGS. 9A-9D depict displaying a launching surface in a non-default display region 106E. Because the launching surface is located in display region 106E, any application launched from the launching surface will also be located in display region 106E. This technique of moving the launching surface to a non-default display region may be performed instead of or in addition to the techniques described above in conjunction with FIGS. 8A-8C, in which the launching surface, e.g. taskbar 302, remains in a default location while application windows are launched in non-default display regions.

As depicted, the launching surface may be displayed in response to pointer 904 performing activation 903 on icon 902. However, the launching surface may be invoked in other ways, such as a keyboard shortcut key. As depicted, the default location of the launching surface is above icon 902 in display region 106D.

Figure 9B:
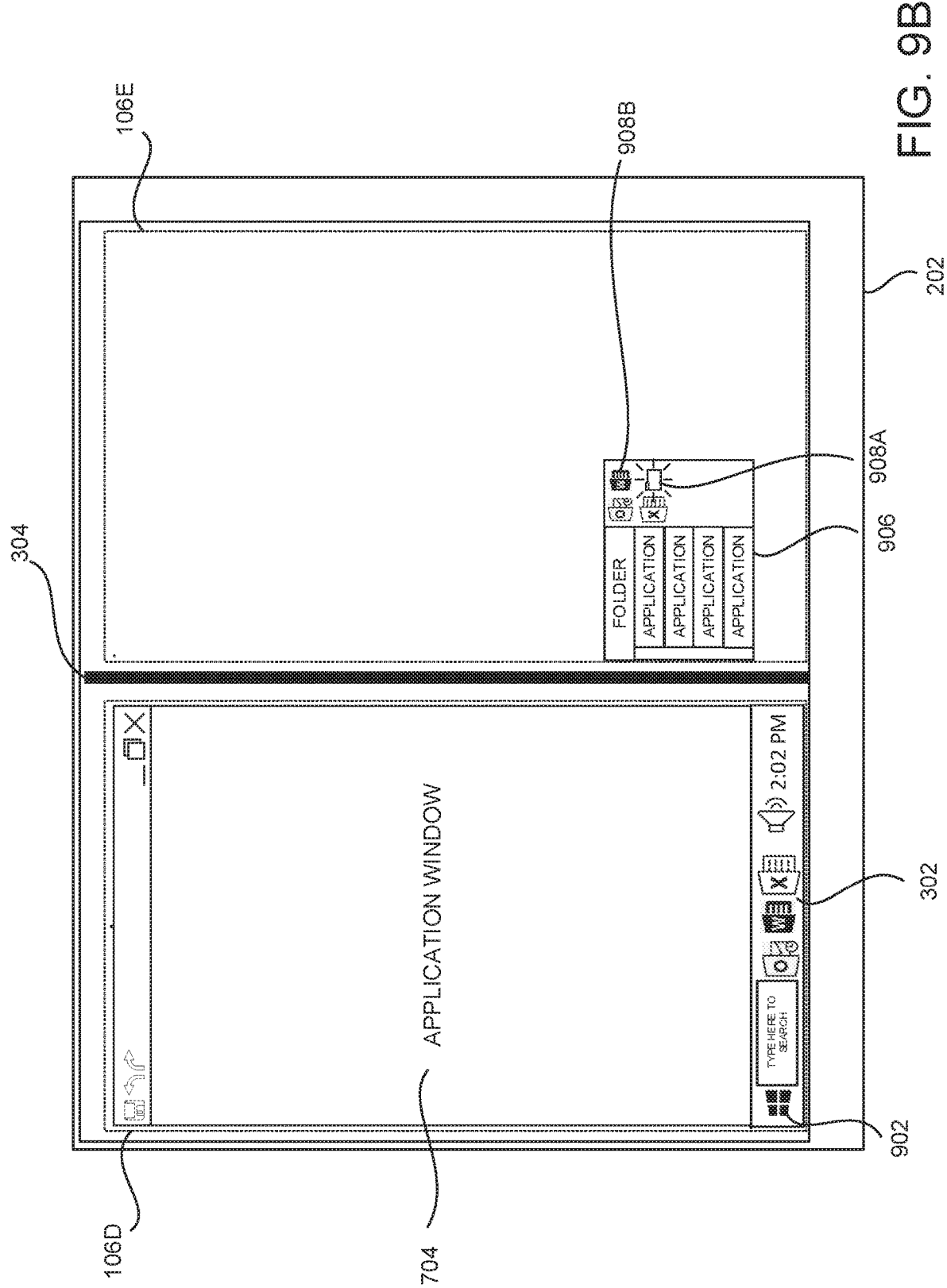
FIG. 9B is a device user interface diagram illustrating a launching surface displayed in a non-default location, according to one embodiment.

Turning now to FIG. 9B, details will be provided regarding a launching surface displayed in a non-default location. As depicted, application launching menu 906 (also referred to as 'menu 906') contains one or more UI elements 908 usable to launch applications. Menu 906 is displayed in non-default display region 106E, such that applications launched from menu 906 will be located in the same non-default display region 106E. Application launching menu 906 may be displayed in non-default display region 106E in response to a determination that some or all of the applications launchable from menu 906 are part of workflows with existing application window 704, and as such are preferentially to be displayed in non-default display region 106E.

For example, icon 908A may be activated by a user to launch a file explorer application. Foldable device 102 may determine the file explorer application is part of a workflow with existing application window 704. As such, foldable device 102 may locate menu 906 in non-default display region 106E such that activating icon 908A will cause the file explorer application to be launched in non-default display region 106E. In some configurations, icon 908A is highlighted or otherwise distinguished as being associated with an application that is part of a workflow with existing application window 704.

Figure 9C:
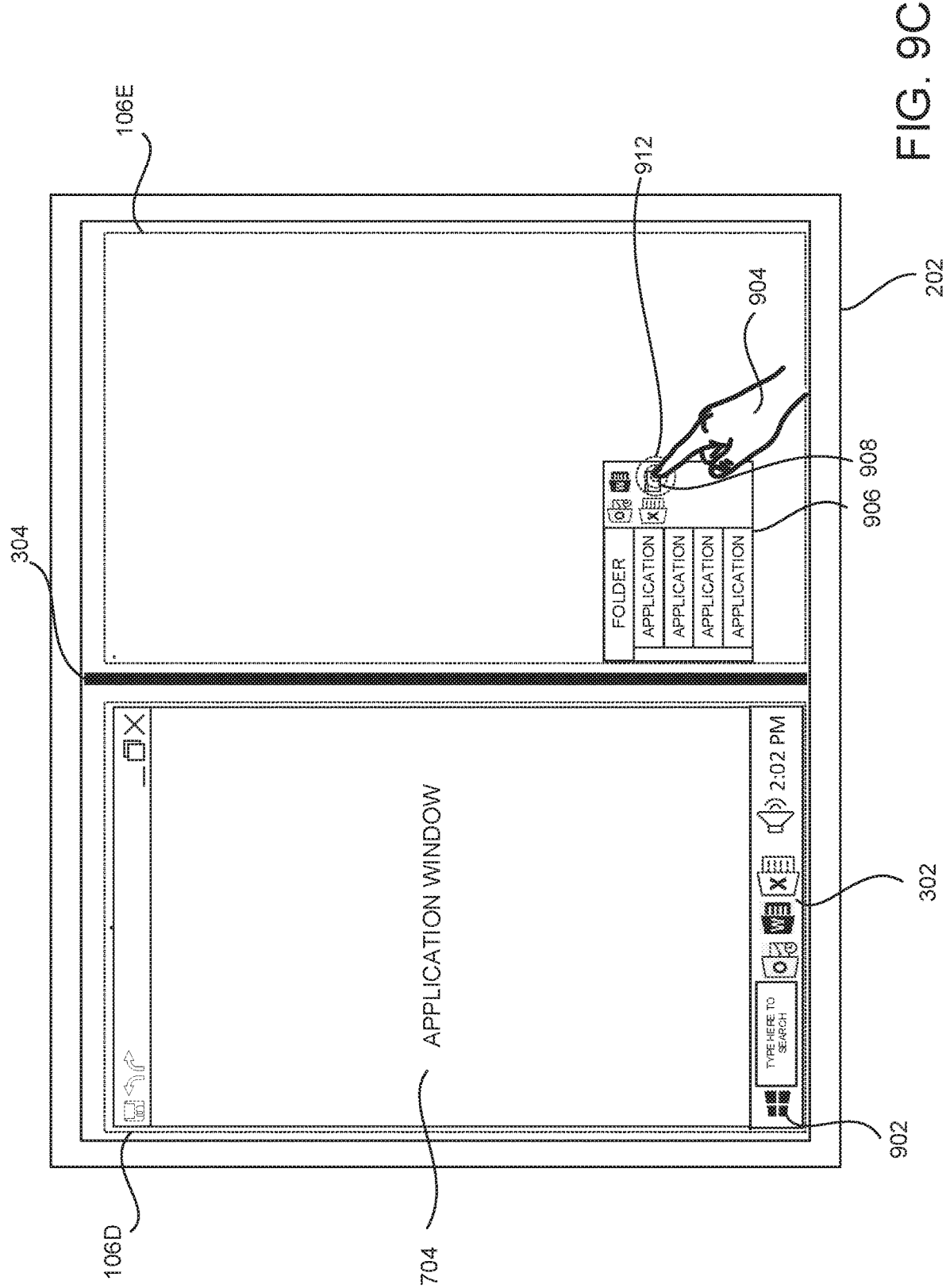
FIG. 9C is a device user interface diagram illustrating activation of a UI element on a launching surface, according to one embodiment.

Turning now to FIG. 9C, details will be provided regarding activation of a UI element 908A on a launching surface 906. As illustrated, pointer 904 performs activation 912 on icon 908.

Turning now to FIG. 9D, details will be provided regarding displaying an application window 914 in response to activation of a UI element 908A on menu 906. As depicted, application window 914 is a file explorer application window 914. In some configurations, a size and location of file explorer application window 914 may be set by the workflow. For example, the size and location may be set as depicted, taking up some but not all of non-default display region 106E. The workflow may alternatively specify that the file explorer application window 914 is to be 'full screen', encompassing most if not all of the non-default display region 106E. The size, location, and other parameters of an application window such as file explorer application window 914 may be inferred from usage data—e.g. the size and location of file explorer application window 914 may be set to parameters that are more commonly used by the user. Foldable device 102 may display OS shell launching surface 906 in a non-default display region to prevent application window 914, or any other application window launched from OS shell launching surface 906, from occluding existing application window 704.

Turning now to FIG. 10A, details will be provided regarding identifying a workflow by identifying two or more application windows that are using the same resource. Scenarios in which multiple application windows may use the same resource include a document review, code review, video editing, or other task that benefits from visualizing a resource from multiple perspectives. In many of these scenarios, user interaction will be improved by arranging the application windows side-by-side, end-to-end, or otherwise tiled across multiple display regions. These arrangements may minimize overlap between the application windows, maximize utilization of available display area, minimize task switching, etc.

Foldable device 102 may determine that two or more application windows are using the same resource while the application windows are running—i.e. not just when an application window has been launched. For example, foldable device 102 may monitor which files an application window opens, which websites an application window visits, which data tables an application window retrieves, etc. By continuously monitoring which resources application windows are using, two application windows that were initially not considered to be part of a workflow may later be determined to be part of a workflow.

Figure 10B:
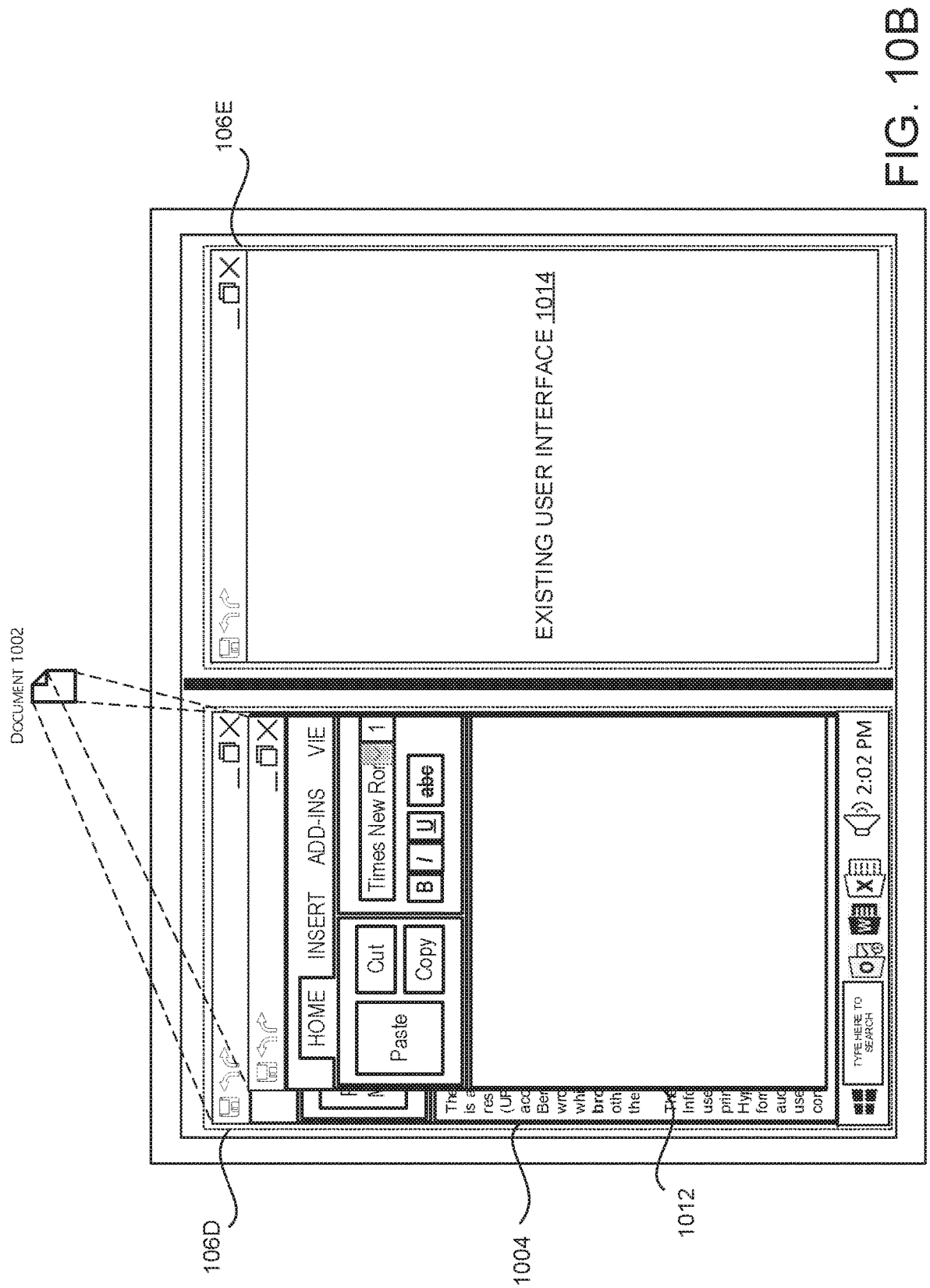
FIG. 10B is a device user interface diagram illustrating a second application window overlapping a first application window, according to one embodiment.
Figure 10C:
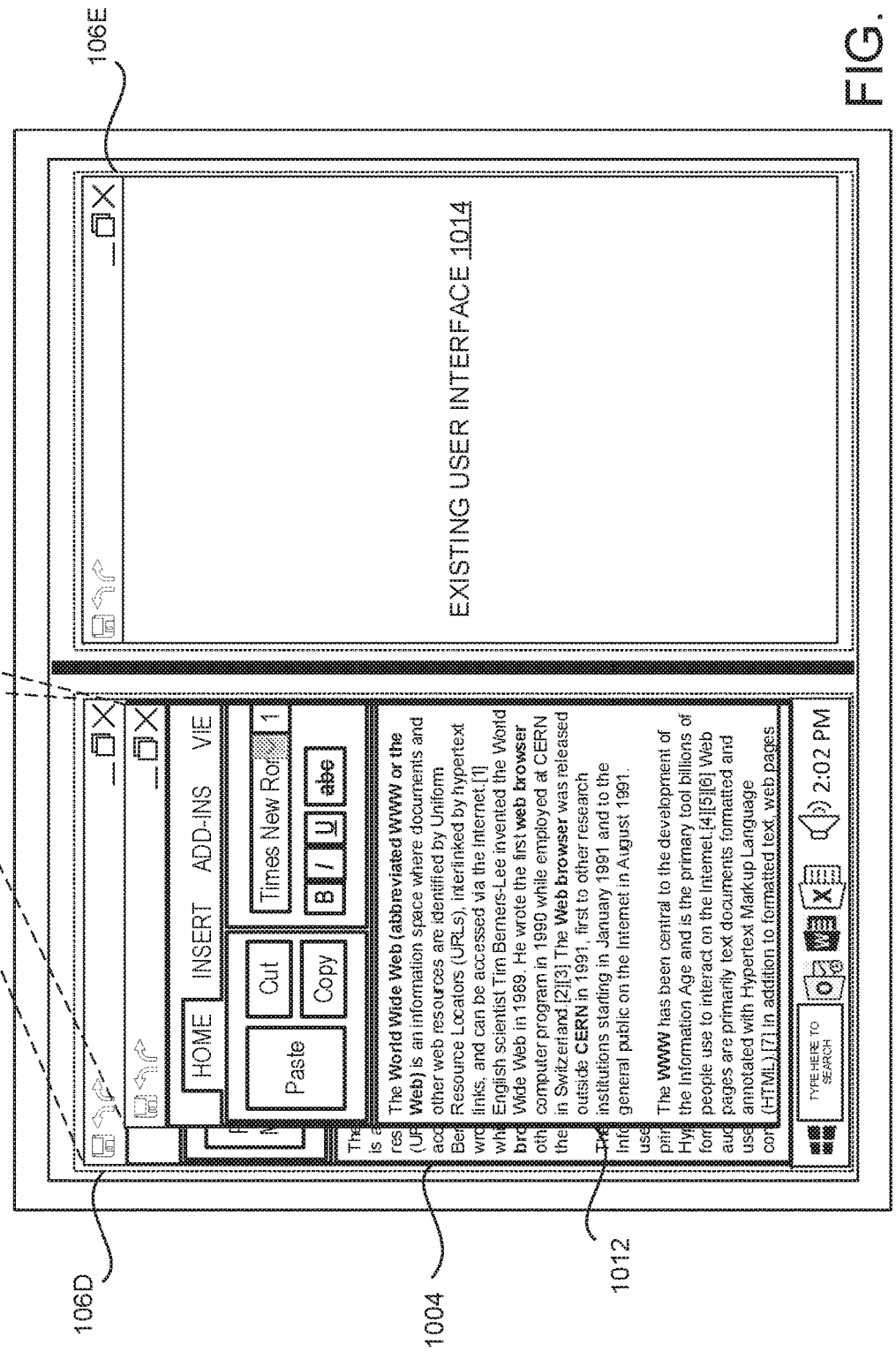
FIG. 10C is a device user interface diagram illustrating a second application window after having loaded the same file as a first application window, according to one embodiment.

As depicted, application window 1004 displays content loaded from document 1002. Document 1002 is an example of a resource that may be used by different application windows. Document 1002 may be stored as a file, locally on foldable device 102 or remotely. While documents stored in files are depicted in FIGS. 10A-10C, other types of resources are similarly contemplated, including data tables, web sites, or any other data resource.

A second application window that also uses document 1002 may be launched in a number of ways. For example, a user may launch the second application window from a launch surface, e.g. application launching menu 906, taskbar 302, or the like. The user may then manually load document 1002. In some cases, the application windows may be different instances of the same application—e.g. they may both be instances of PowerPoint®. However, the application windows may also be associated with different applications.

For example, a user may load document 1002 into a word processor and a web browser, triggering foldable device 102 to recognize a workflow.

Another technique used to launch a second application window, as depicted, is to launch a second instance of application window 1004 from an entry point in application window 1004. For example, "new window" button 1008 may receive activation 1006 when touched by pointer 1010, causing a new instance of application window 1004 to be launched using document 1002.

Turning now to FIG. 10B, details will be provided regarding a second application window 1012 overlapping a first application window 1004. FIG. 10B illustrates a moment between launching application window 1012 via new window button 1008 and application window 1012 loading document 1002. At this time, application windows 1004 and 1012 are not using the same resource, and as such are not identified as part of a workflow based on using the same resource.

Turning now to FIG. 10C, details will be provided regarding second application window 1012 after loading the resource 1002. Foldable device 102 may monitor which resources application windows 1004 and 1012 are using, and when it is determined that they are both using document 1002, foldable device 102 may consider application windows 1004 and 1012 to be part of a workflow. As such, foldable device 102 may move application window 1012 to a non-default display region to create a side-by-side, end-to-end, or other layout of application windows 1004 and 1012. Additionally, or alternatively, as discussed above in conjunction with FIG. 8C, foldable device 102 may leave one or more of application windows 1004 and 1012 in place while adding a user interface element to one or more of application windows 1004 and 1012. In response to activation of one of the user interface elements, foldable device 102 may move and/or resize one or more of application windows 1004 and 1012 to create a layout associated with workflow. In some embodiments, foldable device 102 moves the application window that contains the UI element that was activated, while in other embodiments, foldable device 102 leaves the application window that contains the UI element in place while moving one or more other application windows associated with the workflow.

Figure 10D:
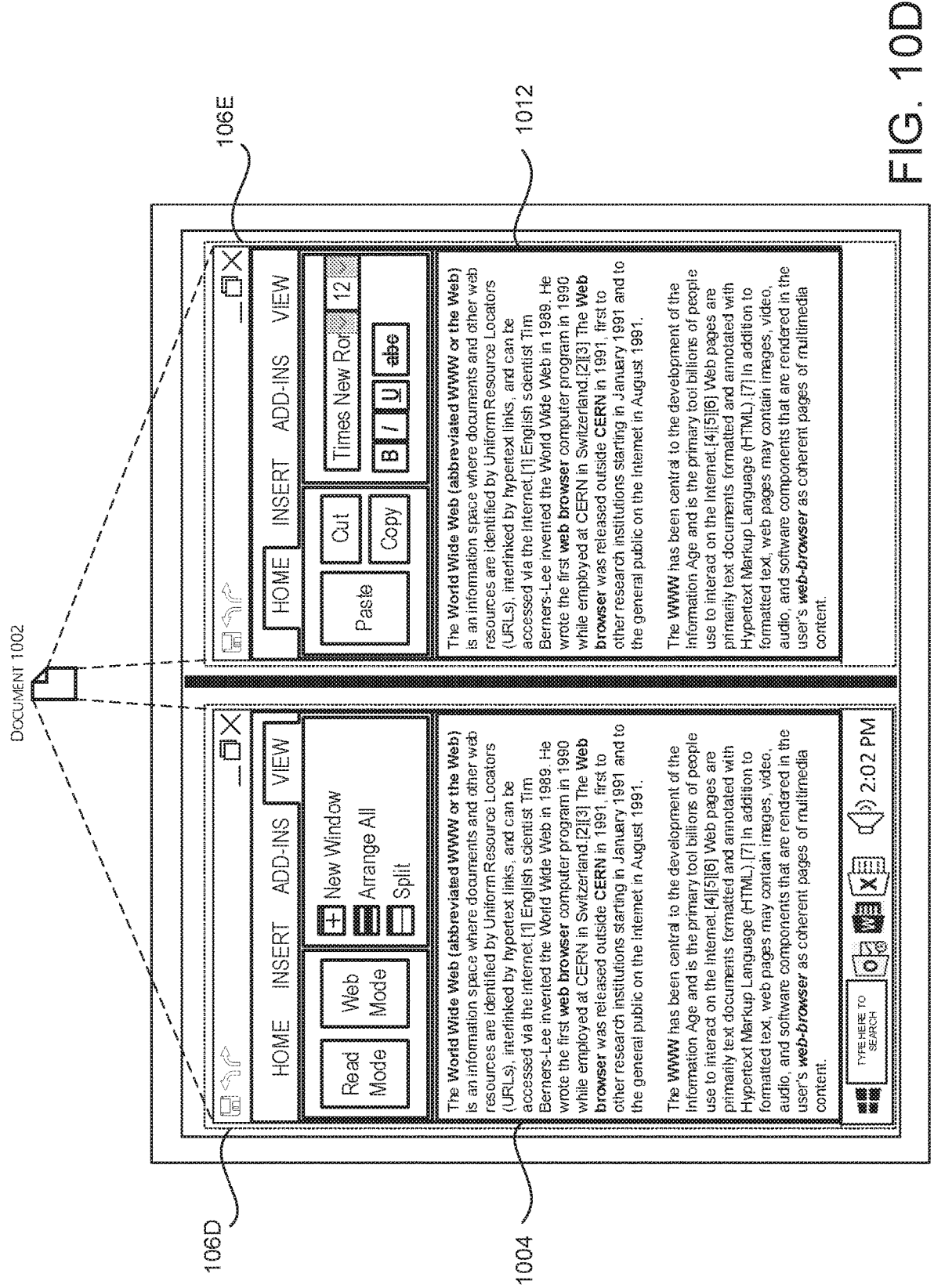
FIG. 10D is a device user interface diagram illustrating a side-by-side layout of application windows that are associated with a workflow due to the use of the same data resource, according to one embodiment.

Turning now to FIG. 10D, details will be provided regarding a side-by-side layout of application windows that are part of a workflow due to the use of the same resource. In some configurations, the side-by-side layout is the result of foldable device 102 monitoring the resources used by application windows 1004 and 1012, determining that they both were using document 1002, and in response, moving application window 1012 to non-default display region 106E to achieve a side-by-side layout specified in the workflow.

As depicted, application window 1004 and application window 1012 are determined to be part of a workflow because both application windows use the same data resource—document 1002. Foldable device 102 may identify application windows that use the same data resource after the second application window has finished loading, or any time thereafter.

In the illustrated embodiment, the second application window 1012 is launched using "new window" button 1008, which automatically loads document 1002 into application window 1012. As such, there is little if any time between launching application window 1012 in display region 106D and relocating application window 1012 to display region 106E. However, in other scenarios discussed above, such as manually launching a second application window and manually loading document 1002 into the second application window, the second application window 1012 may be left in a default display region for much longer periods of time. In some configurations, if one or both of the application windows stops using document 1002, one or both of the application windows may be deprioritized and/or moved to a default location.

A criteria based on application windows using the same resource is one example of a workflow criteria that is based on runtime behavior of application windows. Runtime behavior of an application window refers to the state, actions, location, size, content, and other attributes of an application window as a user is operating foldable device 102. Other runtime behaviors that may also be part of a workflow criteria include whether or not application windows overlap one another, a number of copy and paste commands between application windows, and a number of context-switches between application windows. For example, a workflow criteria may identify application windows as part of a workflow after three copy and paste commands are performed between the two application windows.

Some workflow criteria that refer to runtime behavior may not refer to application name, application type, or any other application-specific identifier. Instead, workflow criteria that refer to runtime behavior may be applied universally to all running application windows.

Some workflow criteria may be based on a runtime analysis of content displayed by application windows. In some configurations, two application windows may be considered part of a workflow if they are displaying similar content, even if the application windows have not obtained the content from the same data resource. In some configurations, foldable device 102 may perform a text or image-based analysis of displayed content to determine if more than a defined amount or percentage of content is being displayed by both application windows. In some configurations, foldable device 102 may take a screenshot of content displayed in the application windows, and perform the analysis on the screenshots.

For example, if a user copies and pastes content from a word processing document into a note taking application, and from the note taking application to an email being composed, foldable device 102 may determine that the word processor and the email application are displaying more than a defined percent, e.g. 80%, of the same content. As such, foldable device 102 may identify at least the word processor and the email application as being associated with a workflow.

Additionally, or alternatively, two or more application windows may be determined to be associated with a workflow if the content they display shares a topic. A topic may be inferred from displayed content by applying a machine learning algorithm to classify the content displayed in each application window. However, other techniques for classifying content, such as applying a keyword search to text content, are similarly contemplated. For example, foldable device 102 may take a screenshot of an email application and a photo viewing application and apply a machine learning algorithm to determine that an email being read in the email application and a photo being viewed in the photo viewing application both have a topic of "tulip". Based on this analysis, foldable device 102 my determine that the email viewing application and the photo viewing application are associated with a workflow.

Application windows may also be determined to be associated with a workflow at runtime based on shared metadata. For example, application window titles, authors, permissions, and other criteria may be used to identify a runtime application workflow.

Figure 11A:
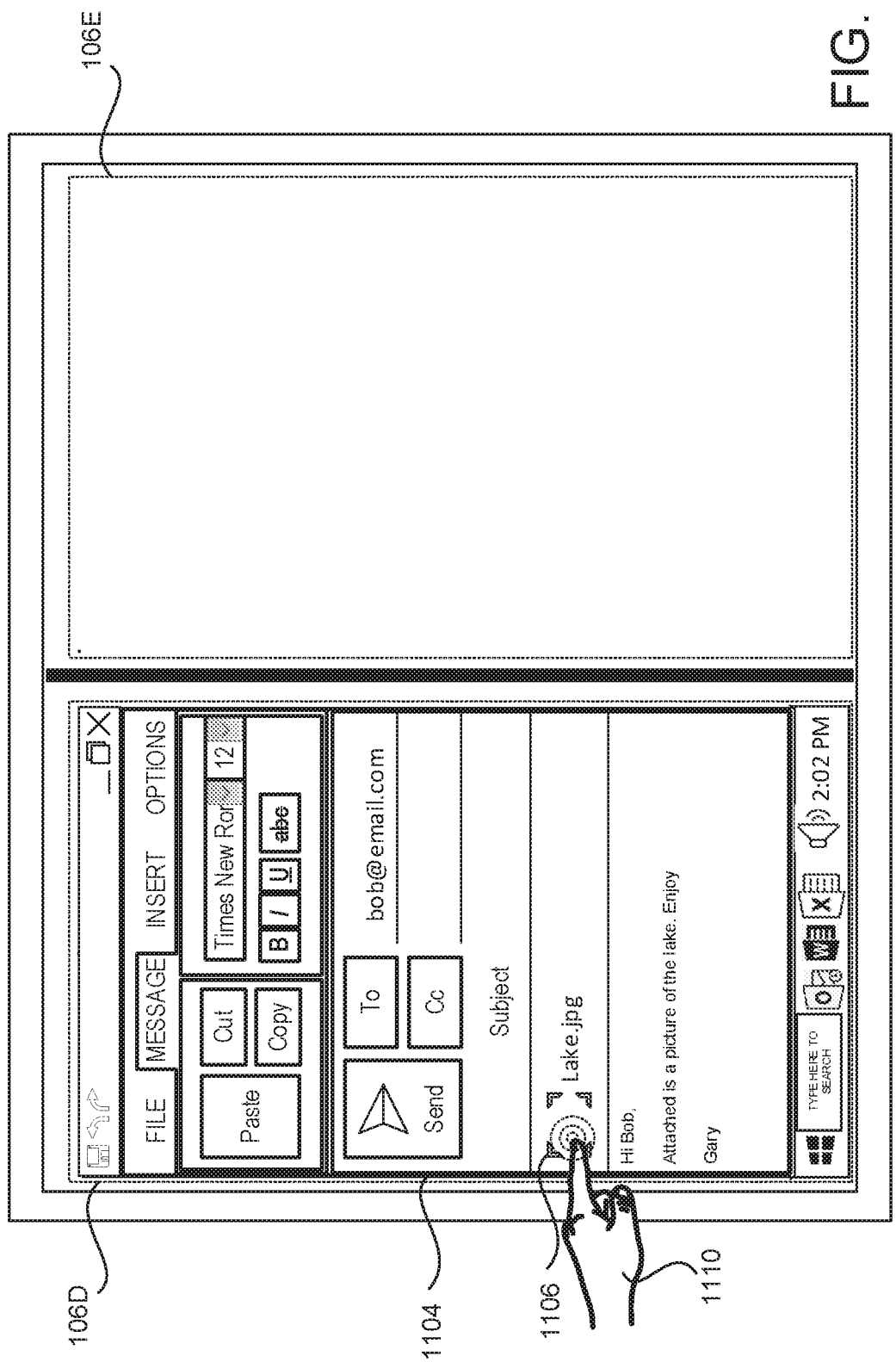
FIG. 11A is a device user interface diagram illustrating aspects of launching an application window from a UI element in an existing application window, according to one embodiment.

Turning now to FIG. 11A, details will be provided regarding launching an application window from a UI element in an existing application window. As depicted, email application 1104 displays an email with an attachment 1106. The attachment is a picture, named Lake.jpg. Pointer 1110 activates the attachment, causing a photo viewer application to be opened. In some configurations, foldable device 102 determines that email application 1104, the parent application window, launched the photo viewer application, the child application window, and as such, a parent-child workflow is identified.

Figure 11B:
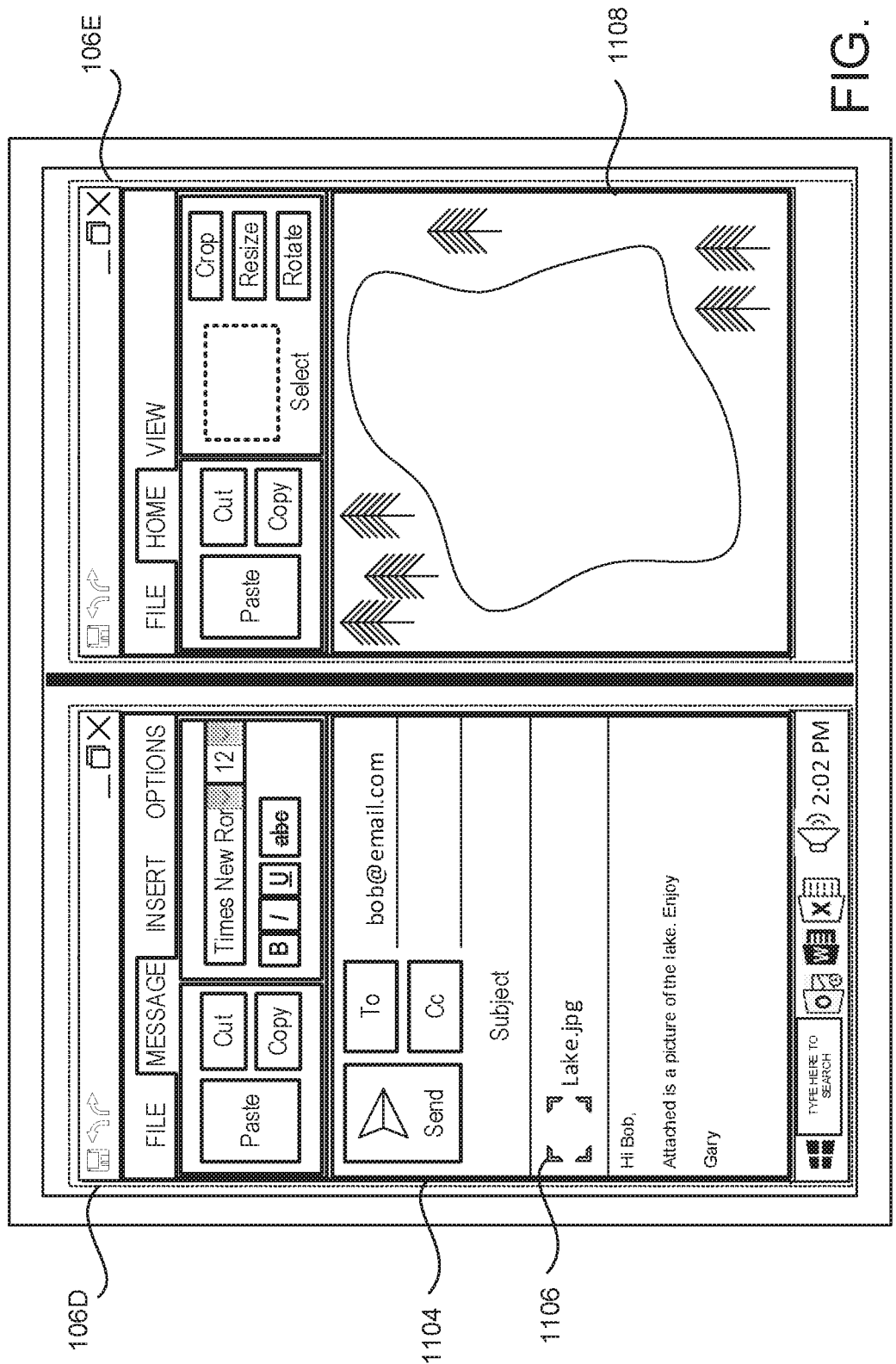
FIG. 11B is a device user interface diagram illustrating a side-by-side arrangement of application windows that are associated with a workflow due to a child application window having been launched from a parent application window, according to one embodiment.

Turning now to FIG. 11B, details will be provided regarding a side-by-side arrangement of application windows that are part of a workflow due to a child application window having been launched from a parent application window. Specifically, Lake.jpg is displayed in photo viewer application 1106, which is a child application window of email application 1104.

Figure 12:
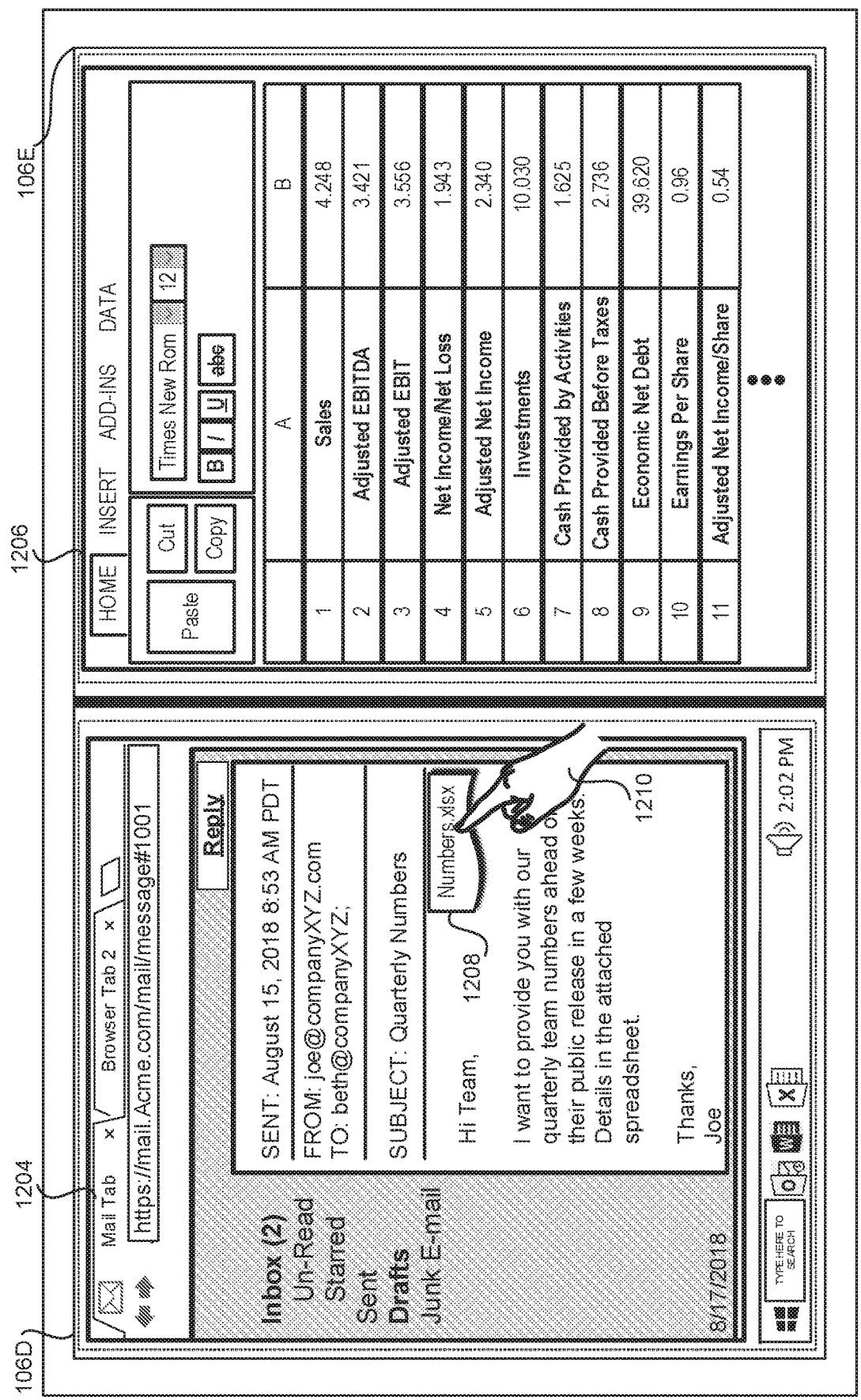
FIG. 12 is a device user interface diagram illustrating a side-by-side arrangement of application windows that are part of a workflow due to one application window loading a file downloaded by another application window, according to one embodiment.

Turning now to FIG. 12, details will be provided regarding a side-by-side arrangement of application windows that are part of a workflow due to one application window loading a file downloaded by another application window. Specifically, web browser application window 1204 has navigated to an email application. The email being displayed has an attachment 1208, "Numbers.xlsx", a spreadsheet. In response to pointer 1210 activating the attachment 1208, "Numbers.xlsx" may be downloaded to foldable device 102. Foldable device 102 may then open the "Numbers.xlsx" with a spreadsheet application. Foldable device 102 may track which application, and in the case of a web browser, which tab a file was downloaded from. In response to opening an application window to display a downloaded file, or to open the downloaded file with an already running application window, foldable device 102 may identify a workflow, i.e. a downloaded file workflow. As a result, foldable device 102 may arrange web browser application window 1204 and spreadsheet application 1206 to achieve a side-by-side layout specified in the workflow.

Figure 13:
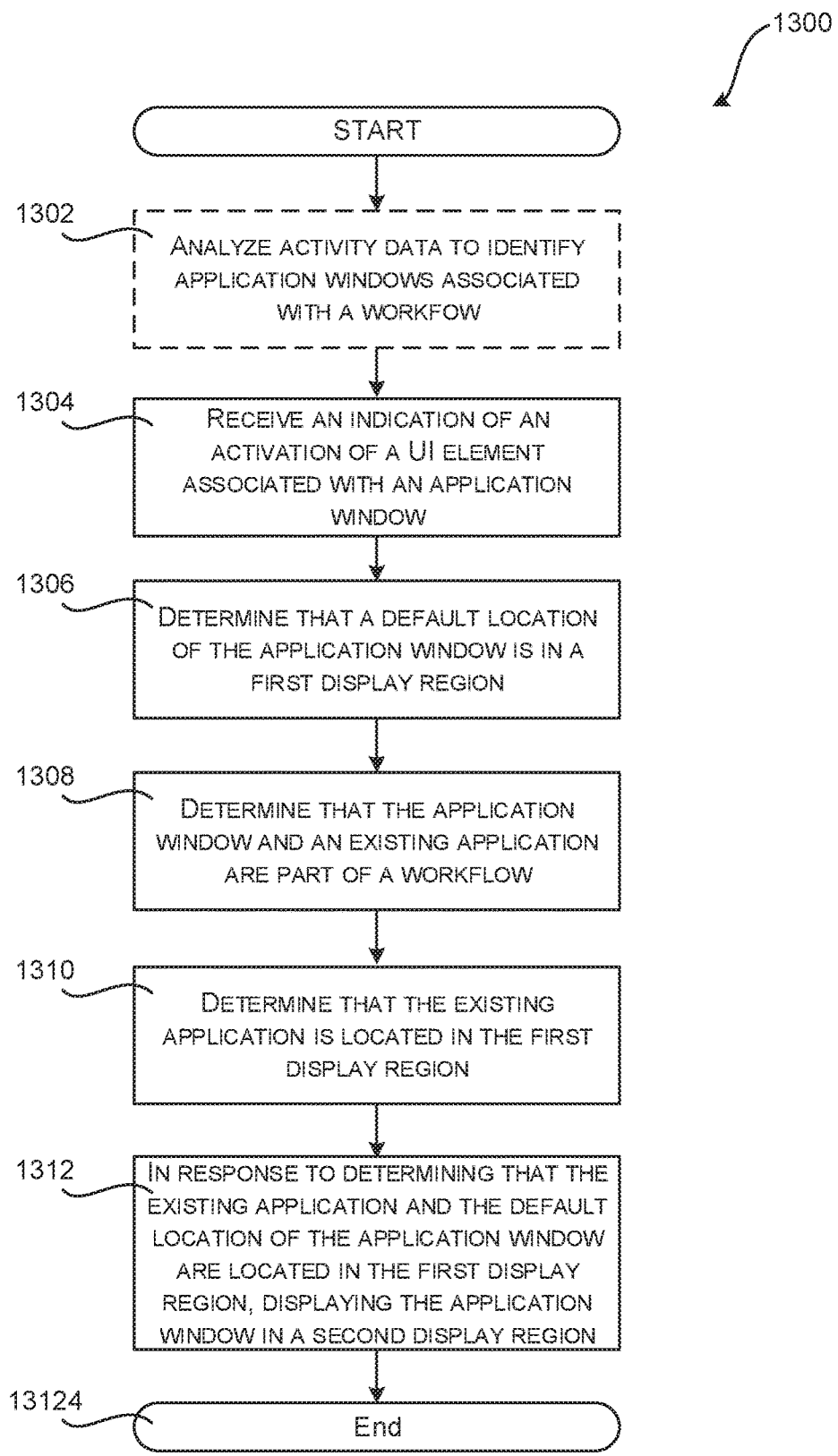
FIG. 13 is a flow diagram showing a routine that illustrates aspects of the operation of a foldable device for positioning application windows based on application layout and user workflows, according to one embodiment.

FIG. 13 is a flow diagram showing a routine 1300 that illustrates aspects of the operation of a foldable device 102 for opportunistically re-locating application windows to enhance a predicted user workflow. It should be appreciated that the logical operations described herein with regard to FIG. 13, and the other FIGS., can be implemented (1) as a sequence of computer implemented acts or program modules running on a computing device and/or (2) as interconnected machine logic circuits or circuit modules within a computing device.

The particular implementation of the technologies disclosed herein is a matter of choice dependent on the performance and other requirements of the computing device. Accordingly, the logical operations described herein are referred to variously as states, operations, structural devices, acts, or modules. These states, operations, structural devices, acts and modules can be implemented in hardware, software, firmware, in special-purpose digital logic, and any combination thereof. It should be appreciated that more or fewer operations can be performed than shown in the FIGS. and described herein. These operations can also be performed in a different order than those described herein.

The routine 1300 optionally begins at operation 1302, where activity data may be analyzed to identify application windows associated with a workflow, as described in detail above.

The routine 1300 then proceeds to operation 1304, where foldable device 102 receives an indication of an activation of a UI element associated with an application window as described in detail above. The routine 1300 then proceeds to operation 1306, where foldable device 102 determines that a default location of the application window is in a first display region, as described in detail above.

The routine 1300 then proceeds to operation 1308, where foldable device 102 determines that the application window and an existing application are part of a workflow, as described in detail above. The routine 1300 then proceeds to operation 1310, where foldable device 102 determines that the existing application is located in the first display region, as described in detail above.

The routine 1300 then proceeds to operation 1312, where foldable device 102 displays the application window in a second display region, as described in detail above. The routine 1300 then proceeds to operation 1314, where it ends.

Figure 14:
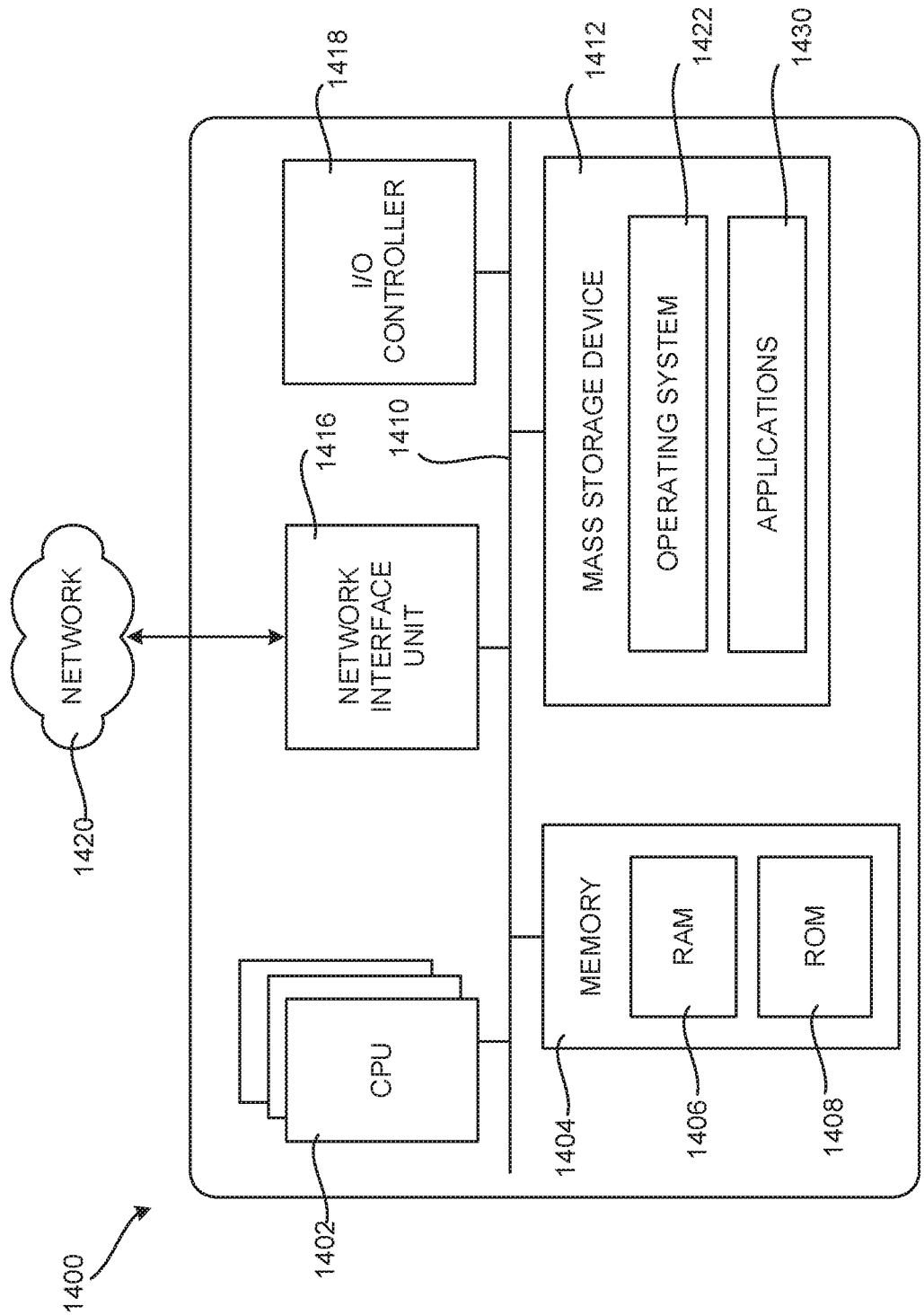
FIG. 14 is a computer architecture diagram showing an illustrative computer hardware and software architecture for a computing device that can implement aspects of the technologies presented herein.

FIG. 14 is a computer architecture diagram showing an illustrative computer hardware and software architecture for a computing device that can implement the various technologies presented herein. In particular, the architecture illustrated in FIG. 14 can be utilized to implement the hinged devices 102 and bendable devices 202 described herein. The illustrated architecture can also be utilized to implement other types of computing systems.

The computer 1400 illustrated in FIG. 14 includes a central processing unit 1402 ("CPU"), a system memory 1404, including a random-access memory 1406 ("RAM") and a read-only memory ("ROM") 1408, and a system bus 1410 that couples the memory 1404 to the CPU 1402. A basic input/output system ("BIOS" or "firmware") containing the basic routines that help to transfer information between elements within the computer 1400, such as during startup, can be stored in the ROM 1408. The computer 1400 further includes a mass storage device 1412 for storing an operating system 1422, application programs 1430, and other types of programs. The functionality described above is implemented by one or more of these programs in various configurations. The mass storage device 1412 can also be configured to store other types of programs and data.

The mass storage device 1412 is connected to the CPU 1402 through a mass storage controller (not shown) connected to the bus 1410. The mass storage device 1412 and its associated computer readable media provide non-volatile storage for the computer 1400. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 1400.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 1400. For purposes of the claims, the phrase "computer storage medium," and variations thereof, does not include waves or signals per se or communication media.

According to various configurations, the computer 1400 can operate in a networked environment using logical connections to remote computers through a network such as the network 1420. The computer 1400 can connect to the network 1420 through a network interface unit 1416 connected to the bus 1410. It should be appreciated that the network interface unit 1416 can also be utilized to connect to other types of networks and remote computer systems. The computer 1400 can also include an input/output controller 1418 for receiving and processing input from a number of other devices, including a keyboard, mouse, touch input, a digital pen, or a physical sensor such as cameras and biometric sensors.

The computer 1400 can also be configured with a suitable video output device that can provide output to one or more display screens, such as those described above. One or more of the displays can be a touch-sensitive display that is configured to detect the presence and location of a touch. Such a display can be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or can utilize any other touchscreen technology. In some configurations, the touchscreen is incorporated on top of a display as a transparent layer to enable a user to use one or more touches to interact with objects or other information presented on the display.

A touch-sensitive display can be configured to detect discrete touches, single touch gestures, and/or multi-touch gestures. These are collectively referred to herein as "gestures" for convenience. Several gestures will now be described. It should be understood that these gestures are illustrative and are not intended to limit the scope of the appended claims.

In some configurations, the computer 1400 supports a tap gesture in which a user taps a display once. A double tap gesture in which a user taps a display twice can also be supported. The double tap gesture can be used for various reasons including, but not limited to, zooming in or zooming out in stages. In some configurations, the computer 1400 supports a tap and hold gesture in which a user taps and maintains contact for at least a pre-defined time. The tap and hold gesture can be used for various reasons including, but not limited to, opening a context-specific menu.

In some configurations, the computer 1400 supports a pan gesture in which a user places a finger on a display and maintains contact with display while moving their finger. The pan gesture can be used for various reasons including, but not limited to, moving through screens, images, or menus at a controlled rate. Multiple finger pan gestures are also contemplated.

In some configurations, the computer 1400 supports a flick gesture in which a user swipes a finger in the direction the user wants the screen to move. The flick gesture can be used for various reasons including, but not limited to, scrolling horizontally or vertically through menus or pages. In some configurations, the computer 1400 supports a pinch and stretch gesture in which a user makes a pinching motion with two fingers (e.g., thumb and forefinger) or moves the two fingers apart. The pinch and stretch gesture can be used for various reasons including, but not limited to, zooming gradually in or out of a website, map, or picture.

Although the gestures described above have been presented with reference to the use of one or more fingers for performing the gestures, other appendages such as digital pens can be used to interact with the computing device 1400. As such, the above gestures should be understood as being illustrative and should not be construed as being limiting in any way.

It should be appreciated that the software components described herein, when loaded into the CPU 1402 and executed, can transform the CPU 1402 and the overall computer 1400 from a general-purpose computing device into a special-purpose computing device customized to facilitate the functionality presented herein. The CPU 1402 can be constructed from any number of transistors or other discrete circuit elements, which can individually or collectively assume any number of states. More specifically, the CPU 1402 can operate as a finite-state machine, in response to executable instructions contained within the software modules disclosed herein. These computer-executable instructions can transform the CPU 1402 by specifying how the CPU 1402 transitions between states, thereby transforming the transistors or other discrete hardware elements constituting the CPU 1402.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 1400 in order to store and execute the software components presented herein. It also should be appreciated that the architecture shown in FIG. 14 for the computer 1400, or a similar architecture, can be utilized to implement other types of computing devices, including hand-held computers, video game devices, embedded computer systems, mobile devices such as smartphones, tablets, and AR/VR devices, and other types of computing devices known to those skilled in the art. It is also contemplated that the computer 1400 might not include all of the components shown in FIG. 14, can include other components that are not explicitly shown in FIG. 14, or can utilize an architecture completely different than that shown in FIG. 14.

It should be appreciated that the computing architecture shown in FIG. 14 has been simplified for ease of discussion. It should also be appreciated that the illustrated computing architecture can include and utilize many more computing components, devices, software programs, networking devices, and other components not specifically described herein.

The disclosure presented herein also encompasses the subject matter set forth in the following clauses:

Example 1. A computer-implemented method for selecting a display region of a foldable device in which to display an application window, comprising: analyzing activity data to identify a plurality of application windows associated with a workflow; receiving an indication of an activation of a UI element in a first display region of the foldable device, wherein the UI element is associated with displaying the application window; determining that the application window and an existing application window are associated with the workflow by determining that identifying information of the existing application window matches identifying information of a first of the plurality of application windows and by determining that identifying information of the application window matches identifying information of a second of the plurality of application windows; determining that the existing application window is located in a first display region of the foldable device; determining that a default location of the application window is in the first display region based on the UI element being located in the first display region; in response to determining that the application window and the existing application window are associated with the workflow, and in response to determining that the existing application window and the default location of the application window are located in the first display region, displaying the application window in a second display region of the foldable device.

Example 2. The computer-implemented method of Example 1, wherein the plurality of application windows comprise a previous instance of the existing application window and a previous instance of the application window, and wherein the activity data indicates that the plurality of application windows are associated with the workflow when the previous instance of the application window and the previous instance of the existing application window have accessed a same data resource.

Example 3. The computer-implemented method of Examples 1 and 2, wherein the plurality of application windows comprise a previous instance of the existing application window and a previous instance of the application window, and wherein the activity data indicates that the plurality of application windows are associated with the workflow when the previous instance of the application window and the previous instance of the existing application have been displayed at the same time in adjacent display regions of the foldable computing device for more than a defined percentage of time or more than a defined amount of time.

Example 4. The computer-implemented method of Examples 1-3, wherein the plurality of application windows comprise a previous instance of the existing application window and a previous instance of the application window, and wherein the activity data indicates that the plurality of application windows are associated with the workflow when user input caused the previous instance of the application window or the previous instance of the existing application to be moved to a different display region, causing the previous instance of the application window and the previous instance of the existing application to be displayed in different display regions.

Example 5. The computer-implemented method of Examples 1-4, wherein the plurality of application windows comprise a previous instance of the existing application window and a previous instance of the application window, and wherein the activity data indicates that the plurality of application windows are associated with the workflow when content has been exchanged between the previous instance of the application window and the previous instance of the existing application window.

Example 6. The computer-implemented method of Examples 1-5, wherein the plurality of application windows comprise a previous instance of the existing application window and a previous instance of the application window, and wherein the activity data indicates that the plurality of application windows are associated with the workflow when the previous instance of the application window and the previous instance of the existing application window have been launched consecutively more than a defined percentage of times or more than a defined number of times.

Example 7. The computer-implemented method of Examples 1-6, wherein the existing application window comprises an application window of a plurality of application windows running on the foldable device that was most recently active.

Example 8. The computer-implemented method of Examples 1-7, wherein the existing application window comprises a UI element that was used to launch the application window.

Example 9. A foldable computing device for selecting a display region of the foldable device in which to display an application window, comprising: one or more processors; and at least one non-transitory computer-readable storage medium having computer-executable instructions stored thereupon which, when executed by the one or more processors, cause the foldable computing device to: receive an indication of an activation of a UI element in a first display region of the foldable device, wherein the UI element is associated with displaying the application window; determine that a default location of the application window is in the first display region; determine that the application window and an existing application window are associated with a workflow based on a determination about a state of the application window and a state of the existing application window; determine that the existing application window is located in the first display region of the foldable device; and in response to determining that the application window and the existing application window are part of the workflow, and in response to determining that the existing application window and the default location of the application window are located in the first display region, display the application window in a second display region of the foldable device.

Example 10. The foldable computing device of Example 9, wherein the determination about the state of the application window and the state of the existing application window comprises a determination that the application window and the existing application window have received data from a same data resource.

Example 11. The foldable computing device of Examples 9 and 10, wherein the determination about the state of the application window and the state of the existing application window comprises a determination that more than a defined percentage of content displayed by the application window is related to content displayed by the existing application window.

Example 12. The foldable computing device of Examples 9-11, wherein the application window is initially displayed in the default location, and wherein the determination that the application window and the existing application window are associated with the workflow occurs after the application window has been displayed.

Example 13. The foldable computing device of Examples 9-12, wherein the UI element is activated by a gesture, and wherein determining that the default location of the application window is in the first display region is based on the gesture ending in the first display region.

Example 14. The foldable computing device of Examples 9-13, wherein the UI element is included in the existing application window, and wherein determining that the default location of the application window is in the first display region comprises determining that the UI element is part of the existing application window.

Example 15. The foldable computing device of Examples 9-14, wherein the existing application window is selected from a plurality of running application windows by selecting a most recently active application window.

Example 16. The foldable computing device of Examples 9-15, wherein the UI element is included in the existing application window, and wherein the existing application window is selected from a plurality of running application windows by selecting an application window that includes the UI element.

Example 17. A non-transitory computer-readable storage medium having computer-executable instructions stored thereupon which, when executed by a foldable computing device, cause the foldable computing device to: analyze activity data to identify a plurality of application windows associated with a workflow; receive an indication of an activation of a UI element in a first display region of the foldable device, wherein the UI element is associated with displaying an operating system (OS) shell surface that includes a UI element associated with launching an application window; determine that a default location of the application window is in the first display region based on the UI element being located in the first display region; determine that the application window and an existing application window are associated with the workflow; determine that the existing application window is located in the first display region of the foldable device; and in response to determining that the application window and the existing application window are part of the workflow, and in response to determining that the existing application window and the default location of the application window are located in the first display region, display the OS shell launching surface in a second display region of the foldable device, wherein the OS shell launching surface includes the user interface element that when activated, causes the application window to be displayed in the second display region of the foldable device.

Example 18. The non-transitory computer-readable storage medium of Example 17, wherein the foldable device comprises a third display region, and wherein the third display region is selected to display the OS shell surface when a score associated with existing content in the third display region is less than a score associated with existing content in the second display region.

Example 19. The non-transitory computer-readable storage medium of Examples 17 and 18, wherein a second existing application displayed in the second display region is minimized, suspended, or closed before displaying the application window in the second display region.

Example 20. The non-transitory computer-readable storage medium of Examples 17-19, wherein the workflow comprises multiple steps, wherein each step is associated with an application window, wherein an estimation of importance is determined for each of the multiple steps, and wherein steps having a greater estimated importance are prioritized for display in the second display region.

Based on the foregoing, it should be appreciated that technologies for positioning user interface components based on application layout and user workflows have been disclosed herein. Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

What is claimed is:

1. A computer-implemented method for selecting a display region of a foldable device in which to display an application window, comprising:
    analyzing activity data to identify a plurality of application windows associated with a workflow;
    receiving an indication of an activation of a user interface (UI) element in a first display region of the foldable device, wherein the UI element is associated with displaying the application window;
    determining that the application window and an existing application window are associated with the workflow by determining that identifying information of the existing application window matches identifying information of a first of the plurality of application windows and by determining that identifying information of the application window matches identifying information of a second of the plurality of application windows;
    determining that the existing application window is located in a first display region of the foldable device;
    determining that a default location of the application window is located in the first display region based on the UI element being located in the first display region;
    in response to determining that the application window and the existing application window are associated with the workflow, and in response to determining that the existing application window and the default location of the application window are located in the first display region, displaying the application window in a second display region of the foldable device.

2. The computer-implemented method of claim 1, wherein the plurality of application windows comprise a previous instance of the existing application window and a previous instance of the application window, and wherein the activity data indicates that the plurality of application windows are associated with the workflow when the previous instance of the application window and the previous instance of the existing application window have accessed a same data resource.

3. The computer-implemented method of claim 1, wherein the plurality of application windows comprise a previous instance of the existing application window and a previous instance of the application window, and wherein the activity data indicates that the plurality of application windows are associated with the workflow when the previous instance of the application window and the previous instance of the existing application have been displayed at a same time in adjacent display regions of the foldable device for more than a defined percentage of time or more than a defined amount of time.

4. The computer-implemented method of claim 1, wherein the plurality of application windows comprise a previous instance of the existing application window and a previous instance of the application window, and wherein the activity data indicates that the plurality of application windows are associated with the workflow when user input caused the previous instance of the application window or the previous instance of the existing application to be moved to a different display region, causing the previous instance of the application window and the previous instance of the existing application to be displayed in different display regions.

5. The computer-implemented method of claim 1, wherein the plurality of application windows comprise a previous instance of the existing application window and a previous instance of the application window, and wherein the activity data indicates that the plurality of application windows are associated with the workflow when content has been exchanged between the previous instance of the application window and the previous instance of the existing application window.

6. The computer-implemented method of claim 1, wherein the plurality of application windows comprise a previous instance of the existing application window and a previous instance of the application window, and wherein the activity data indicates that the plurality of application windows are associated with the workflow when the previous instance of the application window and the previous instance of the existing application window have been launched consecutively more than a defined percentage of times or more than a defined number of times.

7. The computer-implemented method of claim 1, wherein the existing application window comprises an application window of a plurality of application windows running on the foldable device that was most recently active.

8. The computer-implemented method of claim 1, wherein the existing application window comprises a UI element that was used to launch the application window.

9. A foldable computing device for selecting a display region of the foldable device in which to display an application window, comprising:
one or more processors; and
at least one non-transitory computer-readable storage medium having computer-executable instructions stored thereupon which, when executed by the one or more processors, cause the foldable computing device to:
receive an indication of an activation of a user interface (UI) element in a first display region of the foldable computing device, wherein the UI element is associated with displaying the application window;
determine that a default location of the application window is located in the first display region;
determine that the application window and an existing application window are associated with a workflow based on a determination about a state of the application window and a state of the existing application window;
determine that the existing application window is located in the first display region; and
in response to determining that the application window and the existing application window are associated with the workflow, and in response to determining that the existing application window and the default location of the application window are located in the first display region, display the application window in a second display region of the foldable computing device.

10. The foldable computing device of claim 9, wherein the determination about the state of the application window and the state of the existing application window comprises a determination that the application window and the existing application window have received data from a same data resource.

11. The foldable computing device of claim 9, wherein the determination about the state of the application window and the state of the existing application window comprises a determination that more than a defined percentage of content displayed by the application window is related to content displayed by the existing application window.

12. The foldable computing device of claim 9, wherein the application window is initially displayed in the default location, and wherein the determination that the application window and the existing application window are associated with the workflow occurs after the application window has been displayed.

13. The foldable computing device of claim 9, wherein the UI element is activated by a gesture, and wherein determining that the default location of the application window is located in the first display region is based on the gesture ending in the first display region.

14. The foldable computing device of claim 9, wherein the UI element is included in the existing application window, and wherein determining that the default location of the application window is located in the first display region comprises determining that the UI element is part of the existing application window.

15. The foldable computing device of claim 9, wherein the existing application window is selected from a plurality of running application windows by selecting a most recently active application window.

16. The foldable computing device of claim 9, wherein the UI element is included in the existing application window, and wherein the existing application window is selected from a plurality of running application windows by selecting an application window that includes the UI element.

17. A non-transitory computer-readable storage medium having computer-executable instructions stored thereupon which, when executed by a foldable computing device, cause the foldable computing device to:
analyze activity data to identify a plurality of application windows associated with a workflow;
receive an indication of an activation of a first user interface (UI) element located in a first display region of the foldable device, wherein the first UI element is associated with displaying an operating system (OS)

shell surface that includes a second UI element associated with launching an application window;
determine that a default location of the application window is in the first display region based on the first UI element being located in the first display region;
determine that the application window and an existing application window are associated with the workflow;
determine that the existing application window is located in the first display region of the foldable device; and
in response to determining that the application window and the existing application window are associated with the workflow, and in response to determining that the existing application window and the default location of the application window are located in the first display region, display the OS shell surface in a second display region of the foldable device, wherein the OS shell surface includes the second UI element that, when activated, causes the application window to be displayed in the second display region of the foldable device.

18. The non-transitory computer-readable storage medium of claim 17, wherein the foldable device comprises a third display region, and wherein the third display region is selected to display the OS shell surface when a score associated with existing content in the third display region is less than a score associated with existing content in the second display region.

19. The non-transitory computer-readable storage medium of claim 17, wherein a second existing application window displayed in the second display region is minimized, suspended, or closed before displaying the application window in the second display region.

20. The non-transitory computer-readable storage medium of claim 17, wherein the workflow comprises multiple steps, wherein each step is associated with an application window, wherein an estimation of importance is determined for each of the multiple steps, and wherein steps having a greater estimated importance are prioritized for display in the second display region.

* * * * *